United States Patent
Nakamura

(10) Patent No.: US 10,055,520 B2
(45) Date of Patent: Aug. 21, 2018

(54) PROCESS SIMULATOR, LAYOUT EDITOR, AND SIMULATION SYSTEM

(71) Applicant: Toshiba Memory Corporation, Minato-Ku, Tokyo (JP)

(72) Inventor: Mitsutoshi Nakamura, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 63 days.

(21) Appl. No.: 15/057,853

(22) Filed: Mar. 1, 2016

(65) Prior Publication Data
US 2017/0039302 A1 Feb. 9, 2017

(30) Foreign Application Priority Data
Aug. 7, 2015 (JP) ................................. 2015-157759

(51) Int. Cl.
*G06F 17/50* (2006.01)

(52) U.S. Cl.
CPC ...... *G06F 17/5009* (2013.01); *G06F 17/5018* (2013.01); *G06F 17/5045* (2013.01); *G06F 2217/12* (2013.01); *G06F 2217/16* (2013.01); *Y02P 90/265* (2015.11)

(58) Field of Classification Search
CPC ............. G06F 17/5009; G06F 17/5045; G06F 2217/12; G06F 17/5018; G06F 2217/16; Y02P 90/265
See application file for complete search history.

(56) References Cited

U.S. PATENT DOCUMENTS

| | | | |
|---|---|---|---|
| 5,880,977 A | 3/1999 | Syo | |
| 6,219,630 B1 * | 4/2001 | Yonezawa | G06F 17/5036 703/14 |
| 8,943,454 B1 * | 1/2015 | Hsiao | G06F 17/5081 716/113 |
| 2001/0041971 A1 | 11/2001 | Syo | |
| 2009/0217223 A1 * | 8/2009 | Kojima | G06F 17/5068 716/106 |
| 2009/0327982 A1 * | 12/2009 | Komura | G06F 17/5081 716/106 |

(Continued)

FOREIGN PATENT DOCUMENTS

| | | |
|---|---|---|
| JP | 07115071 A | 5/1995 |
| JP | 07147254 A | 6/1995 |

(Continued)

OTHER PUBLICATIONS

Japanese Office Action (and an English language translation thereof) dated Jun. 12, 2018 issued in corresponding Japanese Application No. 2015-157759.

*Primary Examiner* — Vuthe Siek
(74) *Attorney, Agent, or Firm* — Holtz, Holtz & Volek PC

(57) ABSTRACT

According to an embodiment, a process simulator has a layout processing unit to extract vertex coordinates of a first graphic of a layout of a semiconductor device described in a layout file used for a simulation, an initial mesh generation unit to generate a first initial mesh passing through the vertex coordinates in a plane direction of the layout, and a simulator unit to execute a process simulation of the semiconductor device based on simulation data in which a process flow of the semiconductor device is described, the layout, and the first initial mesh.

11 Claims, 29 Drawing Sheets

(56) References Cited

U.S. PATENT DOCUMENTS

2012/0158379 A1\* 6/2012 Kuboi ................ G06F 17/5009
　　　　　　　　　　　　　　　　　　　703/2

FOREIGN PATENT DOCUMENTS

| JP | 08194730 A | 7/1996 |
| JP | H09266299 A | 10/1997 |
| JP | 10012610 A | 1/1998 |
| JP | H11121736 A | 4/1999 |
| JP | 2001022963 A | 1/2001 |
| JP | 2002064198 A | 2/2002 |
| JP | 2003046076 A | 2/2003 |
| JP | 2005203400 A | 7/2005 |

\* cited by examiner

PROCESS SIMULATOR, LAYOUT EDITOR, AND SIMULATION SYSTEM

CROSS REFERENCE TO RELATED APPLICATION

This application is based upon and claims the benefit of priority from the prior Japanese Patent Application No. 2015-157759 filed on Aug. 7, 2015 in Japan, the entire contents of which are incorporated herein by reference.

FIELD

Embodiments described herein relate generally to a process simulator, a layout editor, and a simulation system.

BACKGROUND

There is known a technology CAD (TCAD) system as a simulation system for a semiconductor device. The TCAD system normally includes a process simulator, a device simulator, and a program (electrical characteristic extraction program and the like) to support execution or functions of the simulators.

In the process simulator, simulators for simulations of unit processes in a semiconductor manufacturing process are integrated. The process simulator calculates, based on a given manufacturing process (a process flow called a process of record (POR)) and a layout of a semiconductor device, a structure of the semiconductor device (a shape and a physical amount, such as an impurity distribution). Although there exists a shape simulator which only handles a shape of a semiconductor device, the shape simulator is the extraction of the process simulation accompanying a shape change among the process simulators. Note that, the process simulator in the specification includes the shape simulator.

The device simulator calculates the electrical characteristic of the semiconductor device from the structure of the semiconductor device calculated by the process simulator, an applied voltage applied to the electrode of the semiconductor device, the operation mode of the semiconductor device (static characteristics, dynamic characteristics, or the like). Note that, the device simulator includes a device simulator capable of performing the same calculation as a circuit simulation with the calculation called a Mixed-mode using a compact model of each element mounted in a circuit simulator.

It is desired to efficiently design a semiconductor device with the TCAD system.

DETAILED DESCRIPTION

According to an embodiment, a process simulator comprising:

a layout processing unit to extract vertex coordinates of a first graphic of a layout of a semiconductor device described in a layout file used for a simulation;

an initial mesh generation unit to generate a first initial mesh passing through the vertex coordinates in a plane direction of the layout; and a simulator unit to execute a process simulation of the semiconductor device based on simulation data in which a process flow of the semiconductor device is described, the layout, and the first initial mesh.

Embodiments will now be explained with reference to the accompanying drawings.

(First Embodiment)

Figure 1:
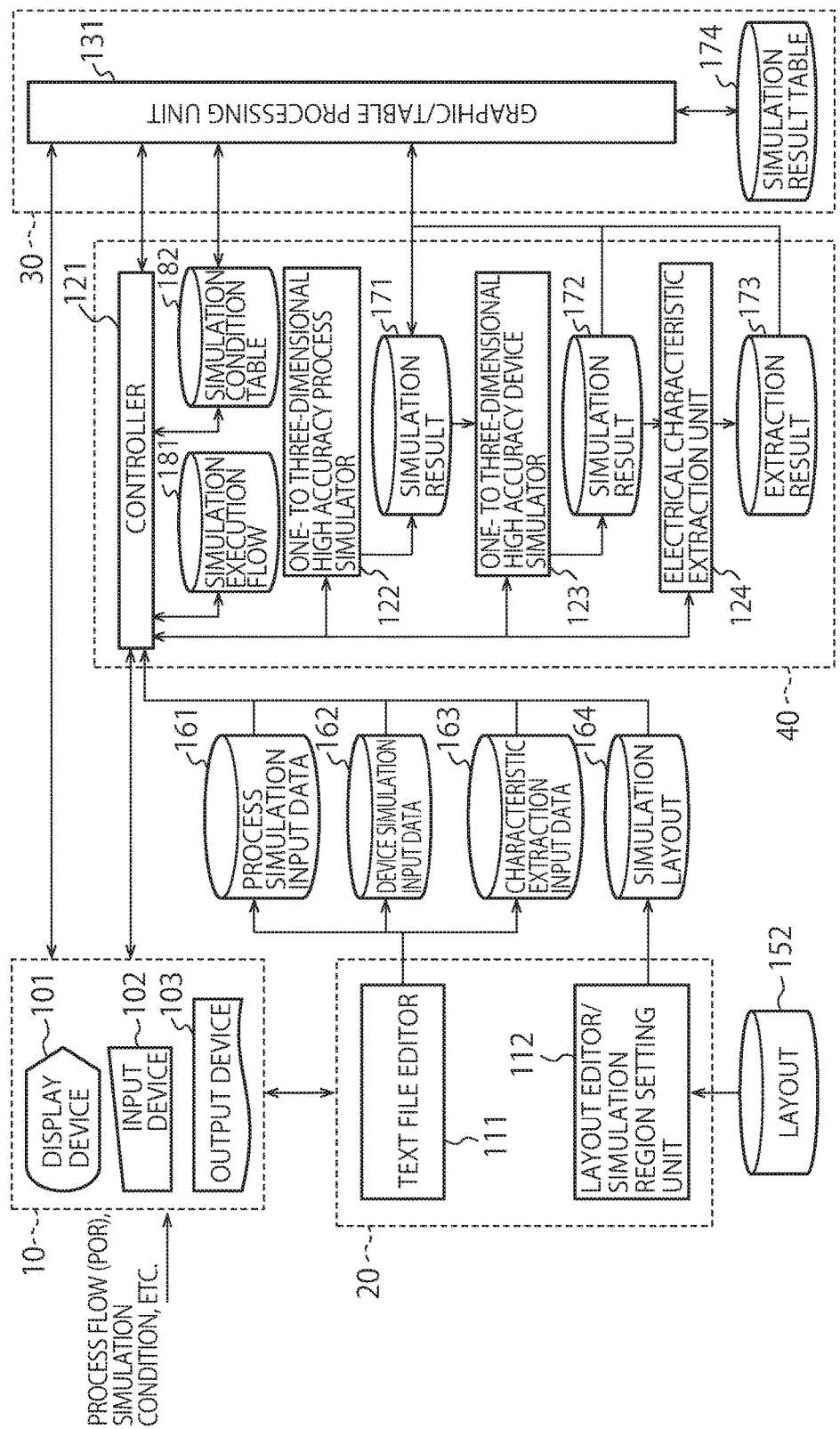
FIG. 1 is a block diagram illustrating a configuration of a TCAD system according to a first embodiment.

FIG. 1 is a block diagram illustrating a configuration of a TCAD system (simulation system) according to a first embodiment. The TCAD system includes a man-machine interface unit (input/output circuitry) 10, an editor unit 20, a result display unit 30, and a simulation execution unit (simulation execution circuitry) 40.

The man-machine interface unit 10 is used to input and output information and includes a display device 101, an input device 102, and an output device 103. An engineer inputs a system control instruction and input data creation with the input device 102 while viewing the display of the display device 101, and outputs information in the system from the output device 103 as needed. The input data creation is, for example, creation for a process flow (POR) and simulation condition.

The editor unit 20 includes a text file editor 111 and a layout editor/simulation region setting unit (layout editor) 112. Instead of or in addition to the text file editor 111, a graphical user interface (GUI) may be provided. The layout editor/simulation region setting unit 112 displays or edits layout data used for manufacturing a semiconductor device.

The engineer creates, via the man-machine interface unit 10 with the text file editor 111, process simulation input data (simulation data) 161, device simulation input data 162, and characteristic extraction input data 163.

Furthermore, the engineer performs, with the layout editor/simulation region setting unit 112, inputting/outputting a layout file (first layout file) 152, editing a layout, setting a simulation region, creating a simulation layout file (second layout file) 164, and the like. The simulation layout file 164 is used for a simulation of the semiconductor device.

The result display unit 30 performs plotting of numerical data and includes a graphic/table processing unit (graphic/table processing circuitry) 131 to perform processing of a simulation condition table 182 and a simulation result table 174. The engineer sets, at the graphic/table processing unit 131, a name and numerical value of a parameter to change the condition in the process simulation input data 161, the device simulation input data 162, and the characteristic extraction input data 163 which are created by using the editor unit 20. Furthermore, the engineer checks the content of the simulation result table 174, which is the result of simulation result files 171 to 173, which will be described later, aggregated by the graphic/table processing unit 131, and performs the operation to output the table to the outside. Note that, the operation may be performed via a controller (control unit) 121, which will be described later, of the simulation execution unit 40.

The simulation execution unit 40 includes at least the controller 121, a one- to three-dimensional high accuracy process simulator (hereinafter, referred to as a process simulator or simulator circuitry) 122, a one- to three-dimensional high accuracy device simulator (hereinafter, referred to as a device simulator) 123, and an electrical characteristic extraction unit (electrical characteristic extraction circuitry) 124. The simulation execution unit 40 is configured so as to hold data, such as a simulation execution flow 181, the simulation result files 171 and 172, and an extraction result file 173 as an external file. The engineer creates the simulation execution flow 181 and performs execution instructions of the simulation and the result aggregation via the controller 121.

The controller 121 fetches, in response to the instruction of the engineer, the simulation execution flow 181, the simulation condition table 182, the process simulation input data 161, the device simulation input data 162, the characteristic extraction input data 163, and the simulation layout file 164. The controller 121 performs the processing to change the condition described in the simulation condition table 182 in accordance with the content described in the simulation execution flow 181, prepares the input data for the process simulator 122, the device simulator 123, and the electrical characteristic extraction unit 124, and executes the simulation. Note that, when the process simulation input data 161, the device simulation input data 162 or the characteristic extraction input data 163 is not related to the change condition described in the simulation condition table 182, the data may be directly passed to the targeted process simulator 122, device simulator 123 or electrical characteristic extraction unit 124 without using the controller 121.

The process simulator 122 executes a process simulation using the process simulation input data 161 which is prepared by the controller 121 and the simulation layout file 164, and stores the simulation result in the simulation result file 171.

The device simulator 123 executes the device simulation using the device simulation input data 162 which is prepared by the controller 121 and the simulation result file 171, and stores the simulation result in the simulation result file 172.

The electrical characteristic extraction unit 124 extracts the electrical characteristics of the device in the semiconductor device using the characteristic extraction input data 163 which is prepared by the controller 121 and the simulation result file 172, and stores the extracted result in the extraction result file 173.

Next, with reference to FIG. 2, a configuration of the process simulator 122 of FIG. 1 will be described in detail.

Figure 2:
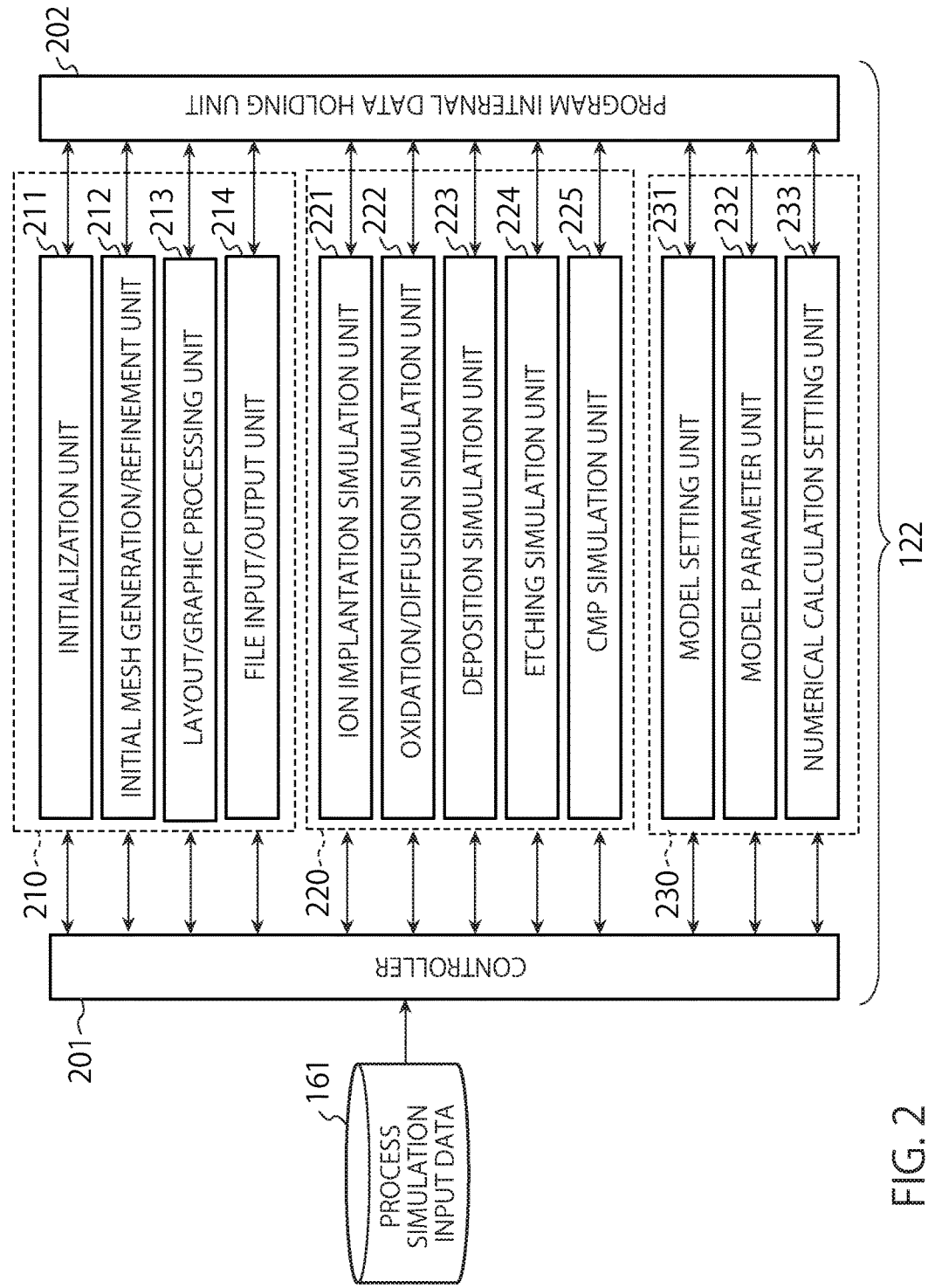
FIG. 2 is a block diagram illustrating a configuration of a process simulator of FIG. 1.

FIG. 2 is a block diagram illustrating the configuration of the process simulator 122 of FIG. 1. The process simulator 122 includes a controller 201, a program internal data holding unit 202, a basic processing unit (basic processing circuitry) 210, a simulator unit (simulator circuitry) 220, and a model/numerical calculation setting unit 230.

The controller 201 controls the entire process simulator 122. The program internal data holding unit 202 holds data commonly used by the units. The basic processing unit 210 performs basic processing required to execute simulations of various processes. The simulator unit 220 executes the simulations of the various processes. The model/numerical calculation setting unit 230 sets a physical/chemical model, a model parameter, and a numerical calculation method which are used in the simulation.

The basic processing unit 210 includes an initialization unit 211, an initial mesh generation/refinement unit 212, a layout/graphic processing unit (layout/graphic processing circuitry) 213, and a file input/output unit (file IO unit) 214. The initialization unit 211 performs an initial setting of the process simulation. The initial mesh generation/refinement unit 212 generates an initial mesh used in the simulation of the semiconductor device and refines the mesh. The layout/graphic processing unit 213 performs information processing of the layout and graphic data processing of the layout. The file input/output unit 214 reads and writes the simulation result.

The simulator unit 220 includes at least an ion implantation simulation unit 221, an oxidation/diffusion simulation unit 222, a deposition simulation unit 223, an etching simulation unit 224, and a chemical mechanical polishing (CMP) simulation unit 225.

The model/numerical calculation setting unit 230 includes a model setting unit 231, a model parameter unit 232, and a numerical calculation setting unit 233. The model setting unit 231 sets and changes the physical/chemical model used in each simulation. The model parameter unit 232 sets and changes the model parameter of the physical/chemical model. The numerical calculation setting unit 233 sets and changes how to calculate the numerical value in each the physical/chemical model. The model setting unit 231, the model parameter unit 232 and the numerical calculation setting unit 233 are not used when the default setting has been used.

The controller 201 reads the process simulation input data 161 and activates, in accordance with the content thereof, the units (functions) of the basic processing unit 210, the simulator unit 220, and the model/numerical calculation setting unit 230. The units of 211 to 214, 221 to 225, and 231 to 233 fetch the necessary data from the program internal data holding unit 202 using the data passed from the controller 201 at the activation, execute each simulation, and store the result in the program internal data holding unit 202.

Next, with reference to FIG. 3, the initial mesh generation/refinement unit 212 of the process simulator of FIG. 2 will be described.

Figure 3:
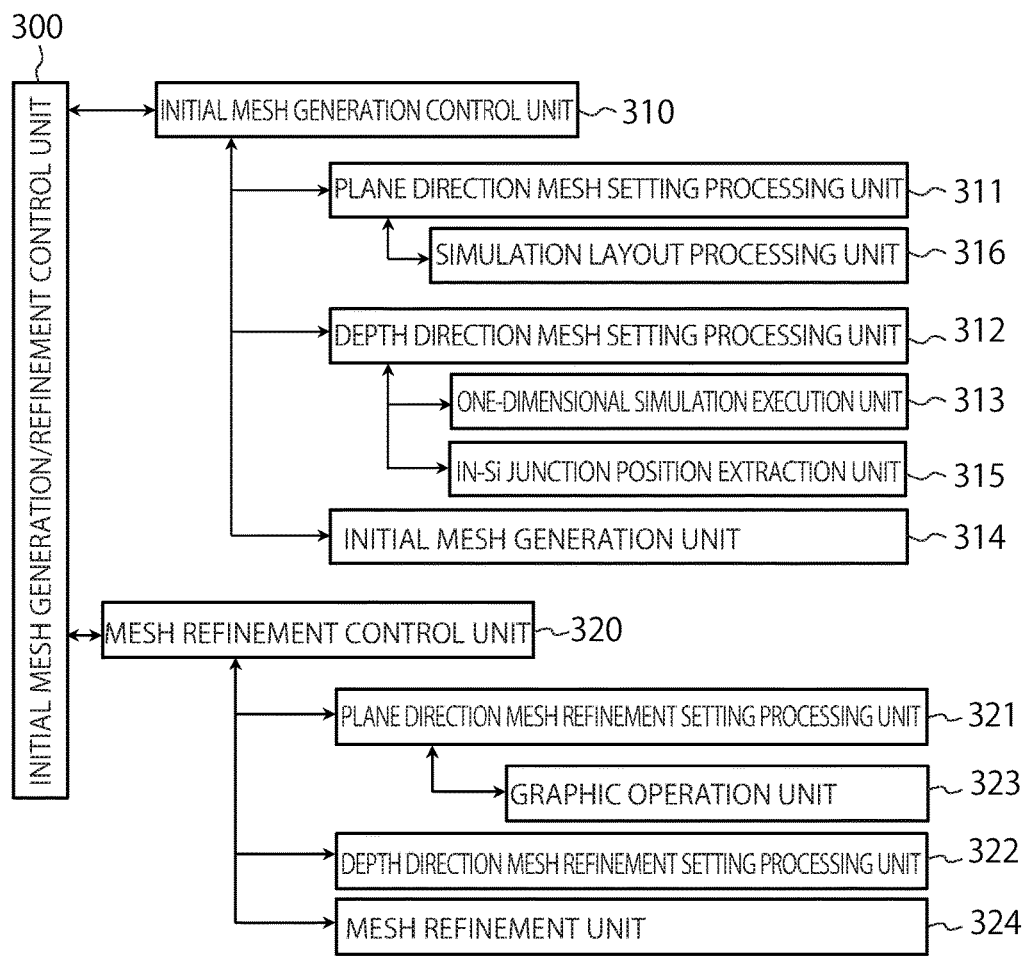
FIG. 3 is a block diagram illustrating a configuration of an initial mesh generation/refinement unit of FIG. 2.

FIG. 3 is a block diagram illustrating a configuration of the initial mesh generation/refinement unit 212 of FIG. 2. The initial mesh generation/refinement unit 212 includes an initial mesh generation/refinement control unit 300, an initial mesh generation control unit 310, a plane direction mesh setting processing unit (mesh setting processing circuitry) 311, a depth direction mesh setting processing unit 312, a one-dimensional simulation execution unit 313, an initial mesh generation unit (initial mesh generator) 314, an in-silicon junction position extraction unit (in-silicon junction position extraction circuitry) 315, a simulation layout processing unit (layout processing circuitry) 316, a mesh refinement control unit 320, a plane direction mesh refinement setting processing unit (plane direction mesh refinement setting processing circuitry) 321, a depth direction mesh refinement setting processing unit 322, a graphic operation unit (graphic operation circuitry) 323, and a mesh refinement unit 324.

The initial mesh generation/refinement control unit 300 activates, in accordance with the instruction and the parameter which are given by the controller 201 of FIG. 2, the initial mesh generation control unit 310 or the mesh refinement control unit 320 and transmits the instruction and the necessary information. Furthermore, the initial mesh generation/refinement control unit 300 transmits, as needed, the information of the simulation layout file 164 to the simulation layout processing unit 316 via the initial mesh generation control unit 310.

The initial mesh generation control unit 310 performs, based on the instruction and the information which are received from the initial mesh generation/refinement control unit 300, mesh setting processing in the plane direction at the plane direction mesh setting processing unit 311. The plane direction is the in-plane direction of a plane parallel to the surface of the layout, that is, the plane parallel to a silicon substrate surface.

The simulation layout processing unit 316 extracts, in response to the instruction to use the simulation layout file 164, vertex coordinates of a graphic (first graphic) in the layout of the semiconductor device described in the simulation layout file 164.

The plane direction mesh setting processing unit 311 performs the mesh setting processing in the plane direction using the extracted vertex coordinates.

Thereafter, the initial mesh generation control unit 310 performs the mesh setting processing in the depth direction at the depth direction mesh setting processing unit 312 and generates the initial mesh at the initial mesh generation unit 314.

The depth direction mesh setting processing unit 312 executes, in response to the instruction to execute a one-dimensional simulation in the depth direction, the one-dimensional simulation at the one-dimensional simulation execution unit 313. Thereafter, the depth direction mesh setting processing unit 312 extracts, based on the one-dimensional simulation result, a junction position or the like in the silicon substrate at the in-silicon junction position extraction unit 315 and sets the mesh in the depth direction using the extracted junction position or the like.

The mesh refinement control unit 320 performs, based on the instruction and the information which are received from the initial mesh generation/refinement control unit 300, setting processing related to the mesh refinement in the plane direction at the plane direction mesh refinement setting processing unit 321. Thereafter, the mesh refinement control unit 320 performs the setting processing related to the mesh refinement in the depth direction at the depth direction mesh refinement setting processing unit 322, and refines the mesh at the mesh refinement unit 324.

The plane direction mesh refinement setting processing unit 321 executes, in response to the instruction to execute graphic operation, the graphic operation at the graphic operation unit 323, and performs the setting processing related to the mesh refinement in the plane direction using the result.

Next, with reference to FIG. 4, a configuration of the layout editor/simulation region setting unit 112 of FIG. 1 will be described.

Figure 4:
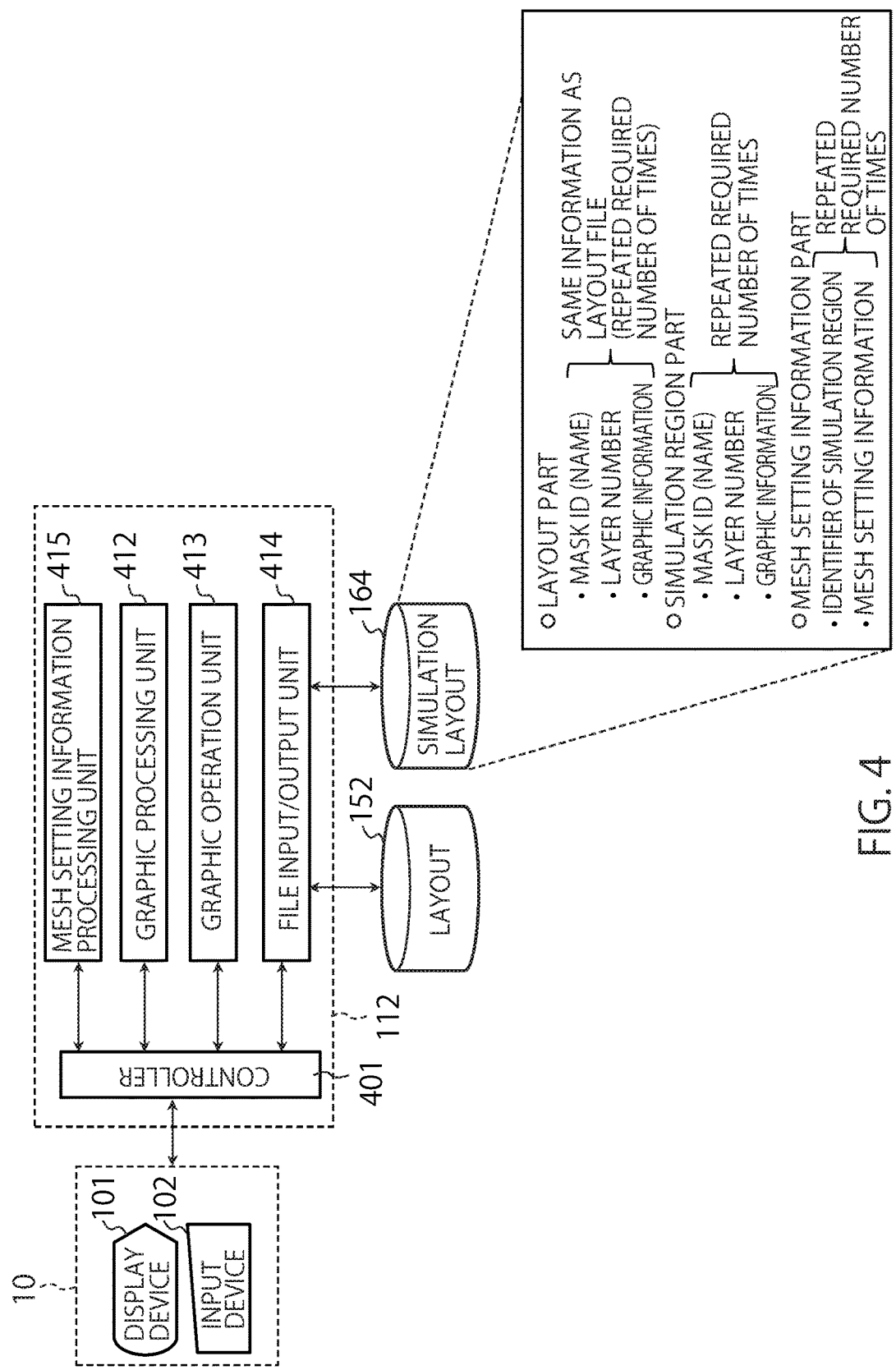
FIG. 4 is a block diagram illustrating a configuration of a layout editor/simulation region setting unit of FIG. 1.

FIG. 4 is a block diagram illustrating the configuration of the layout editor/simulation region setting unit 112 of FIG. 1. The layout editor/simulation region setting unit 112 includes a controller 401, a graphic processing unit (graphic processing circuitry) 412, a graphic operation unit (graphic operation circuitry) 413, a file input/output unit (file input/output circuitry) 414, and a mesh setting information processing unit (mesh setting information processing circuitry) 415.

The controller 401 controls the processing of the units in conjunction with the display device 101 which displays a screen and the input device 102 which detects typed keys or a moved pointer by the engineer. In other words, the controller 401 processes the information input from the man-machine interface unit 10 to create the layout of the semiconductor device.

The graphic processing unit 412 performs, based on the information input by the input device 102, creating a graphic of the layout (a point, an edge, a polygon, or the like), editing the graphic, and adding an identifier to the graphic to the layout before editing, and creates a graphic indicating a simulation region where the simulation is executed, under the control of the controller 401.

The graphic operation unit 413 performs, under the control of the controller 401, the graphic operation to the graphic created by the graphic processing unit 412 and thereby creates a new graphic.

The mesh setting information processing unit 415 associates, in accordance with the engineer's instruction via the input device 102 and the display device 101 (the man-machine interface unit 10), the mesh setting information of the initial mesh with the graphic of the layout using the identifier, under the control of the controller 401. The mesh setting information includes, for example, space information (mesh interval information) of the initial mesh. More specifically, the mesh setting information processing unit 415 sets the mesh setting information to at least a line segment of the graphic of the layout.

The file input/output unit 414 reads a layout file 152, in which the layout before editing is described, and writes, to the simulation layout file 164, the information of the layout edited by the graphic processing unit 412, the mesh setting information associated with the graphic of the layout using the identifier, and the graphic indicating the simulation region.

In the layout file 152, the layout information of the semiconductor device is stored and described in a common format, such as a GDS format.

The simulation layout file 164 includes a layout part, a simulation region part, and a mesh setting information part.

The layout part describes a layout used in a patterning process (lithography process) of the process simulation and holds the same information as the layout file 152. The layout part holds, based on a mask name (mask ID) and a layer number in the layout file 152, a graphic from which a layout used in an actual simulation is extracted.

The simulation region part holds the graphic indicating the simulation region (the vertex coordinates of the simulation region) and the same information (the mask ID, the layer number, and the graphic information) as the layout part in the simulation region. The mask ID and the layer number is used, as needed, to specify the simulation region by extracting one piece of the graphic information from a plurality of pieces of layout information at starting the process simulation.

The mesh setting information part includes pairs of the identifier of the simulation region and the mesh setting information.

As described above, in the simulation layout file 164, the mesh setting information is associated, as needed, with each graphic (a point, an edge, and a polygon) of the layout part and the simulation region part by the identifier of the simulation region. Therefore, it is recognized that the mesh setting information has been set to which graphic.

Figure 5:
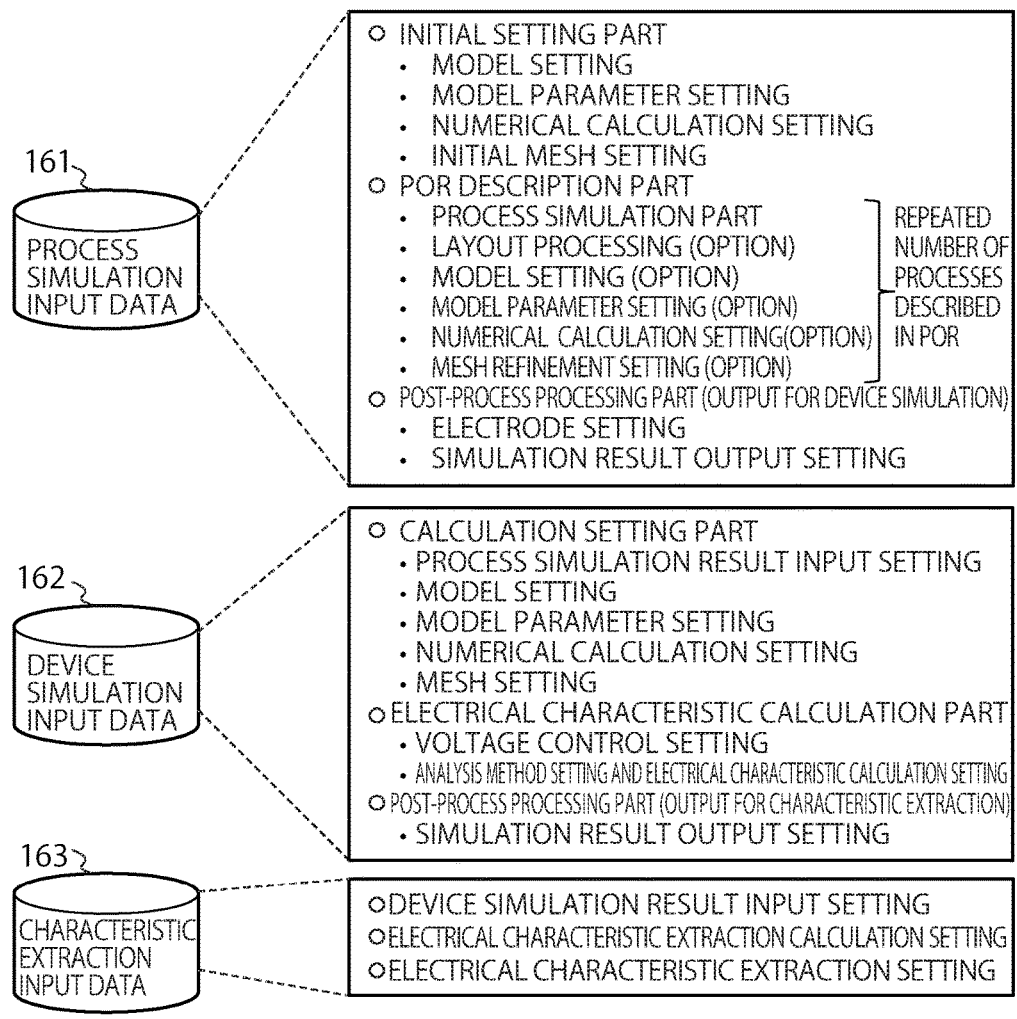
FIG. 5 is a diagram illustrating the contents of process simulation input data, device simulation input data, and characteristic extraction input data of FIG. 1.

Next, with reference to FIG. 5, the contents of the process simulation input data 161, the device simulation input data 162, and the characteristic extraction input data 163 of FIG. 1 will be described.

The process simulation input data 161 includes an initial setting part, a POR description part, and a post-process processing part. The initial setting part describes, as needed, a model setting used by each process simulation part described by the POR description part, a model parameter setting, a numerical calculation setting, and an initial mesh setting. In other words, the initial setting part describes the initialization method of the simulation. The initial mesh setting may include coordinates indicating the simulation region, to which the initial mesh is set, and numerical values related to the mesh setting in the depth direction.

Each process simulation part of the POR description part performs description related to the simulation of the corresponding process in accordance with a POR in which the manufacturing process (process flow) of the semiconductor device is described. At this time, in a process which requires a particular setting, the description related to the layout processing, the model setting, the model parameter setting, the numerical calculation setting, and the mesh refinement setting is also performed.

The post-process processing part describes an electrode setting for the device simulation to be executed and a simulation result output setting for display.

The device simulation input data 162 includes a calculation setting part, an electrical characteristic calculation part, and the post-process processing part.

The calculation setting part describes a process simulation result input setting, the model setting, the model parameter setting, the numerical calculation setting, and the mesh setting. The mesh setting includes the information related to the mesh refinement used when a mesh which is different from the mesh of the process simulation is set in the device simulation.

The electrical characteristic calculation part describes a voltage control setting to set a voltage (there is a case of current, charge, or the like) applied to the electrode, and an analysis method setting and an electrical characteristic calculation setting to set which analysis method (a static characteristics analysis, a dynamic characteristics analysis, or the like) to be executed.

The post-process processing part describes the simulation result output setting for the electrical characteristic extraction to be performed or the display.

The characteristic extraction input data 163 includes a device simulation result input setting in which a setting to fetch the device simulation result is described, an electrical characteristic extraction calculation setting in which how the electrical characteristic is extracted is described, and an electrical characteristic extraction setting in which a setting to actually extract the electrical characteristic is described.

The simulation of semiconductor device is executed using the TCAD system having the above described configuration.

Next, as an example, the initial mesh setting and the mesh refinement in the process simulation when a three-dimensional simulation of a single metal-oxide-semiconductor field-effect transistor (MOSFET) is high-accurately executed will be described in detail with reference to FIGS. 6A to 8C.

Figure 6A:
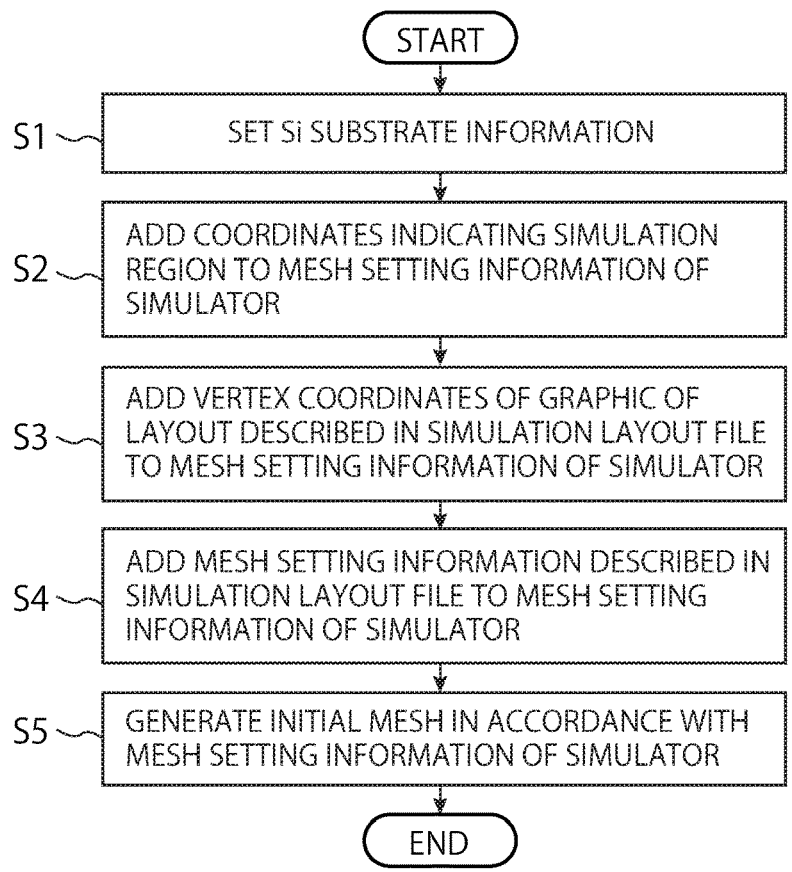
FIG. 6A is a flowchart illustrating algorithm of the initial mesh generation/refinement unit of FIG. 3.

FIG. 6A is a flowchart illustrating algorithm of the initial mesh generation/refinement unit 212. The initial mesh setting is performed at an initial stage of the process simulation.

First, in step S1, the initial mesh generation control unit 310 performs the setting of the silicon substrate information (the thickness of the silicon substrate, the kind and concentration of the impurity, or the like).

Next, in step S2, the plane direction mesh setting processing unit 311 adds, to the mesh setting information (second mesh setting information) of the simulator, the coordinates indicating the simulation region described in the process simulation input data 161 or the simulation layout file 164. Thus, the outline of the initial mesh in the plane direction (the boundary of the simulation region) is generated so as to pass through the coordinates.

Next, in step S3, the simulation layout processing unit 316 extracts the vertex coordinates of the graphic of the layout described in the simulation layout file 164. Then, the plane direction mesh setting processing unit 311 adds the extracted vertex coordinates to the mesh setting information of the simulator.

Next, in step S4, the plane direction mesh setting processing unit 311 adds, to the mesh setting information of the simulator, the mesh setting information (first mesh setting information) associated with the graphic of the layout and described in the simulation layout file 164.

Thereafter, in step S5, the initial mesh generation unit 314 generates, in accordance with the mesh setting information of the simulator, the initial mesh in the plane direction (first initial mesh) in the simulation region. More specifically, the initial mesh generation unit 314 generates, in the plane direction of the layout (the silicon substrate surface of the semiconductor device), the initial mesh in the plane direction passing through the vertex coordinates of the graphic of the layout.

Figure 6B:
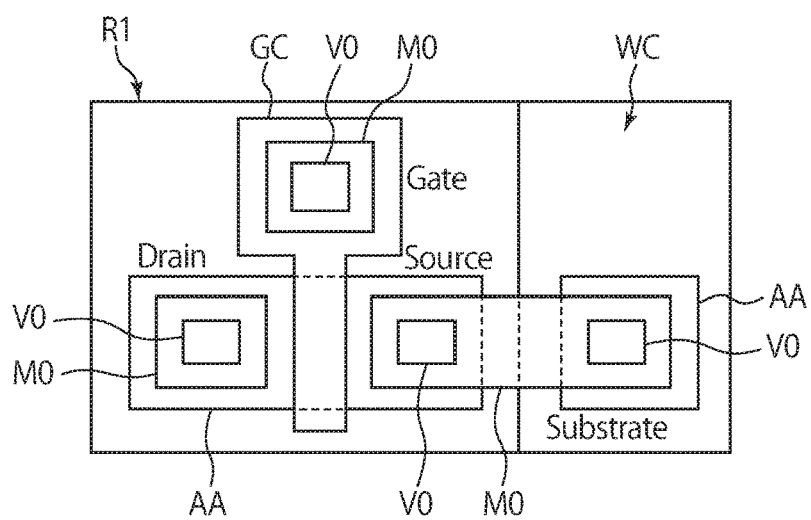
FIG. 6B is a plan view illustrating an example of a layout of a MOSFET in a simulation region where a three-dimensional simulation is executed.
Figure 6C:
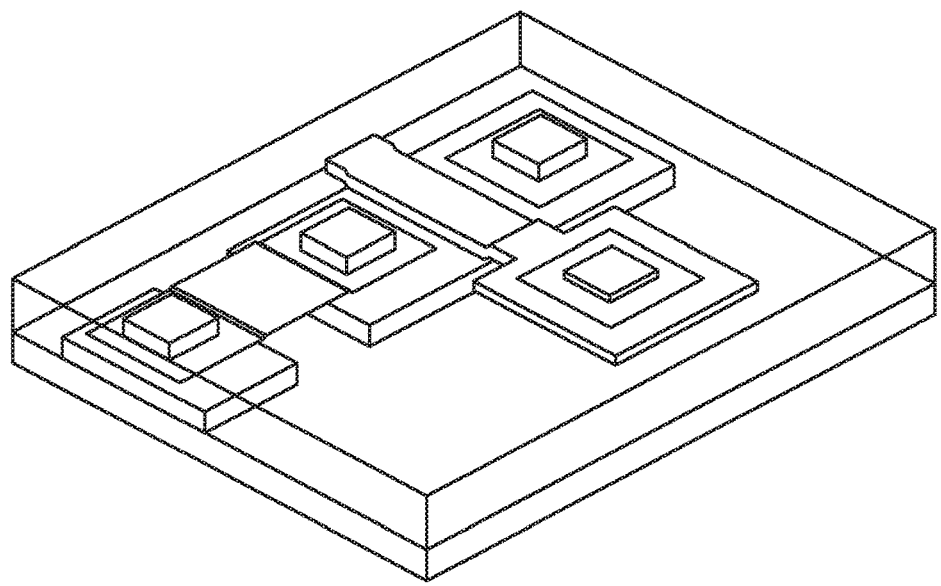
FIG. 6C is a perspective view illustrating a structure of the MOSFET manufactured using the layout of FIG. 6B.

FIG. 6B is a plan view illustrating an example of a layout of the MOSFET in a simulation region R1 where the three-dimensional simulation is executed. The layout is consists of five masks AA, GC, V0, M0, and WC. Furthermore, FIG. 6C is a perspective view illustrating a structure of the MOSFET manufactured using the layout of FIG. 6B. In FIG. 6C, an insulating film is not illustrated in order to clarify the structure.

Figure 6D:
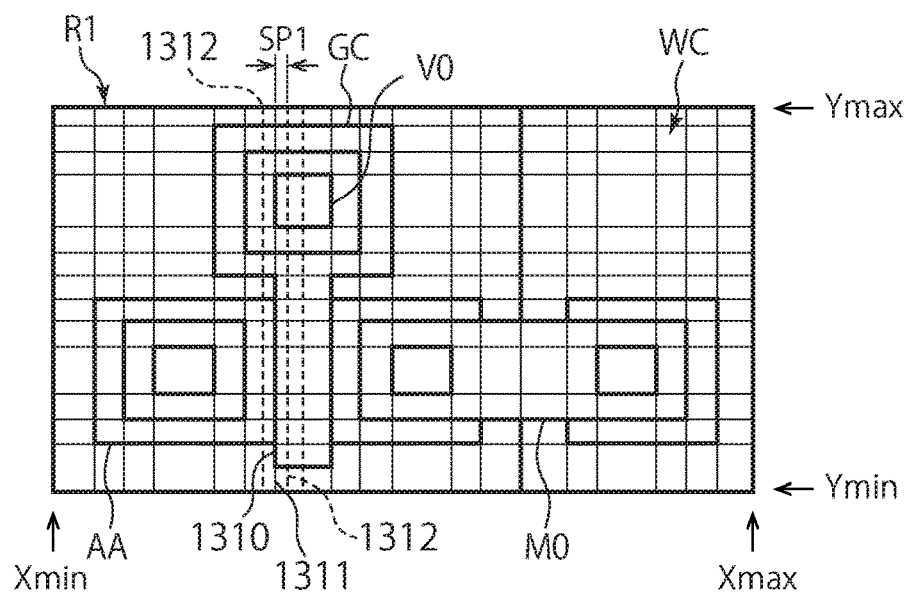
FIG. 6D is a diagram illustrating an initial mesh generated in accordance with the algorithm of FIG. 6A.

FIG. 6D is a diagram illustrating the initial mesh generated in accordance with the algorithm of FIG. 6A. With the coordinates Xmin, Xmax in the X axis direction and the coordinates Ymin, Ymax in the Y axis direction which indicate the simulation region, the simulation region R1 in the plane direction where the three-dimensional simulation is executed is defined. These coordinates Xmin, Xmax and coordinates Ymin, Ymax are described in the process simulation input data 161 or the simulation layout file 164 as described above.

In FIG. 6D, by using a method for specifying the space as the mesh generation method, the initial mesh is generated to the layout of the MOSFET of FIG. 6B. Here, in order to facilitate the understanding, the case where a space SP1 is set only to a line segment 1310 of the mask GC is illustrated. Since the vertex coordinates of the graphic of the layout is added to the mesh setting information of the simulator in step S3, a straight line (solid line) 1311 passing through these vertex coordinates is generated in the simulation region R1. Furthermore, since the mesh setting information including the space information of the space SP1 associated with the graphic of the mask GC is added to the mesh setting information of the simulator in step S4, the spaces SP1 are provided at both sides of the line segment 1310 of the mask GC and, a straight line (dashed line) 1312 is added. In this manner, appropriate space information (the mesh setting information) can be set for the graphic of each layout, and it is possible to appropriately set a space between the initial mesh and the line segment (edge) of the layout.

Figure 7A:
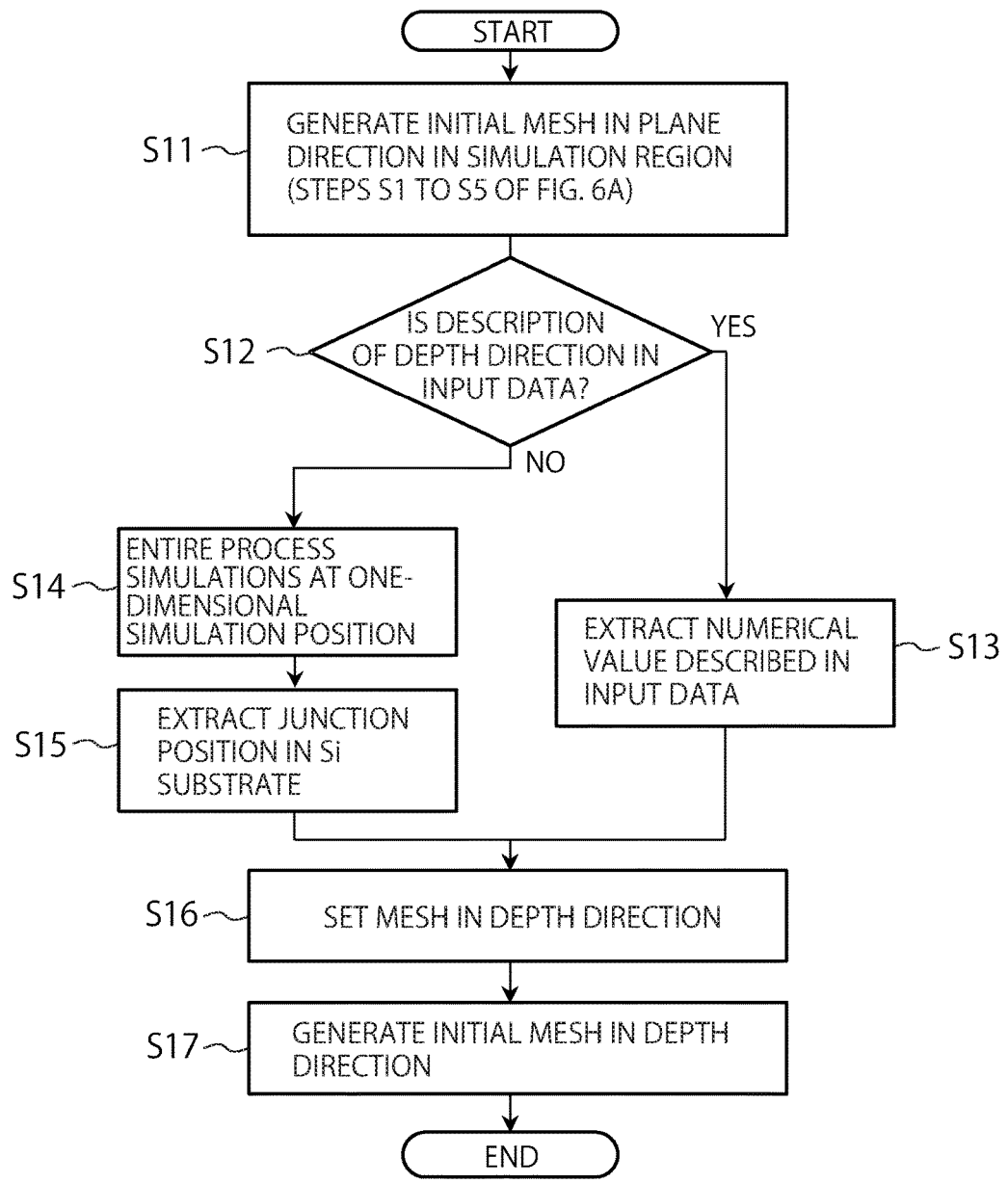
FIG. 7A is a flowchart illustrating algorithm of an initial mesh setting in the depth direction.

Next, the depth direction will be described. FIG. 7A is a flowchart illustrating algorithm of the initial mesh setting in the depth direction. First, in step S11, the initial mesh generation processing illustrated in FIG. 6A is performed. Then, in step S12, it is determined whether or not the numerical value related to the mesh setting in the depth direction has been described in the process simulation input data 161. When the numerical value related to the mesh setting in the depth direction has been described (step S12; Yes), the numerical value described in the process simulation input data 161 is extracted in step S13, and the processing proceeds to step S16.

On the other hand, when the numerical value related to the mesh setting in the depth direction has not been described in the process simulation input data 161 (step S12; No), the entire process simulation is executed at a one-dimensional simulation position specified by the engineer in step S14. The one-dimensional simulation position is a point or a minute region. Then, the junction position in the silicon substrate is extracted based on the one-dimensional simulation result in step S15, and the processing proceeds to step S16.

Figure 7B:
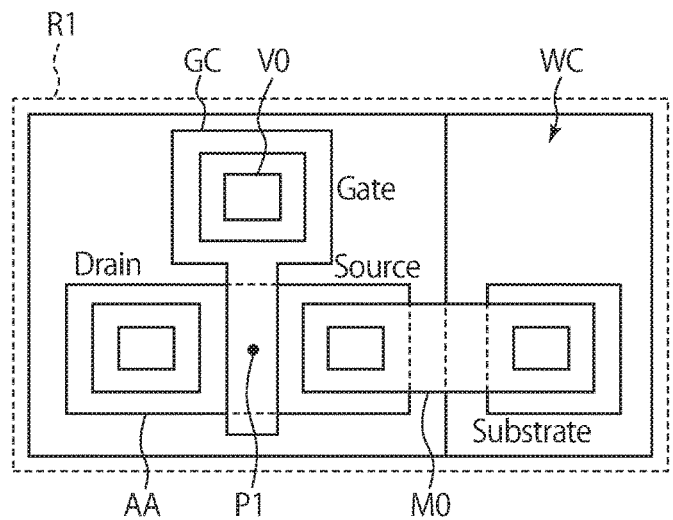
FIG. 7B is a diagram illustrating a one-dimensional simulation position.
Figure 7C:
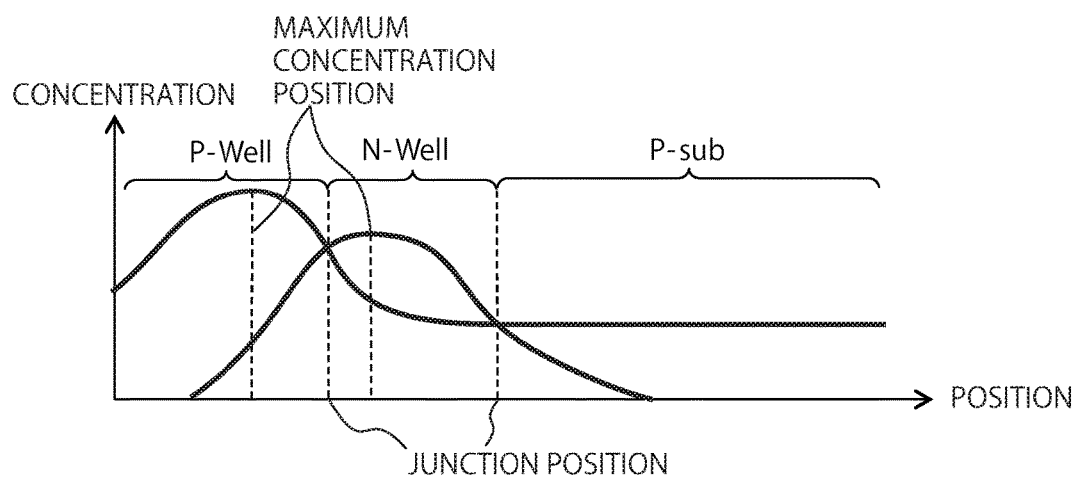
FIG. 7C is a diagram illustrating a simulation result of an entire process using the one-dimensional simulation position of FIG. 7B.

Here, the reason the step is divided into step S13 and step S14 will be described. If the impurity concentration distribution in the silicon substrate is known in advance, it is possible to set a fine mesh position and a coarse mesh position in order to accurately efficiently perform the numerical calculation. However, if the impurity concentration distribution is not known, the setting cannot be performed. Therefore, as the means for solving the problem, the impurity concentration distribution is obtained by executing the one-dimensional simulation faster than the three-dimensional simulation. Thus, for example, the simulation result of the entire process using a one-dimensional simulation position P1 of FIG. 7B is illustrated in FIG. 7C. The maximum concentration position and the junction position can be recognized from the simulation result, and it is possible to determine how to set the density of the mesh.

Next, in step S16, the mesh setting in the depth direction is performed based on the value extracted in step S13 or S15. Finally, in step S17, the initial mesh in the depth direction (second initial mesh) is generated.

Then, the simulator unit 220 of the process simulator 122 executes the process simulation of the semiconductor device based on the process simulation input data 161 in which the process flow of the semiconductor device is described, the layout of the simulation layout file 164, and the initial mesh in the plane direction.

Next, with reference to FIGS. 8A to 8C, the mesh refinement to be executed as needed during each process simulation after the initial mesh is generated will be described. The mesh refinement is executed in, for example, the process being performing the description related to the mesh refinement setting in the POR description part of the process simulation input data 161.

Note that, when the mesh required in the process simulation is different from the mesh required in the device simulation, the mesh refinement is performed at the execution of the device simulation.

Figure 8A:
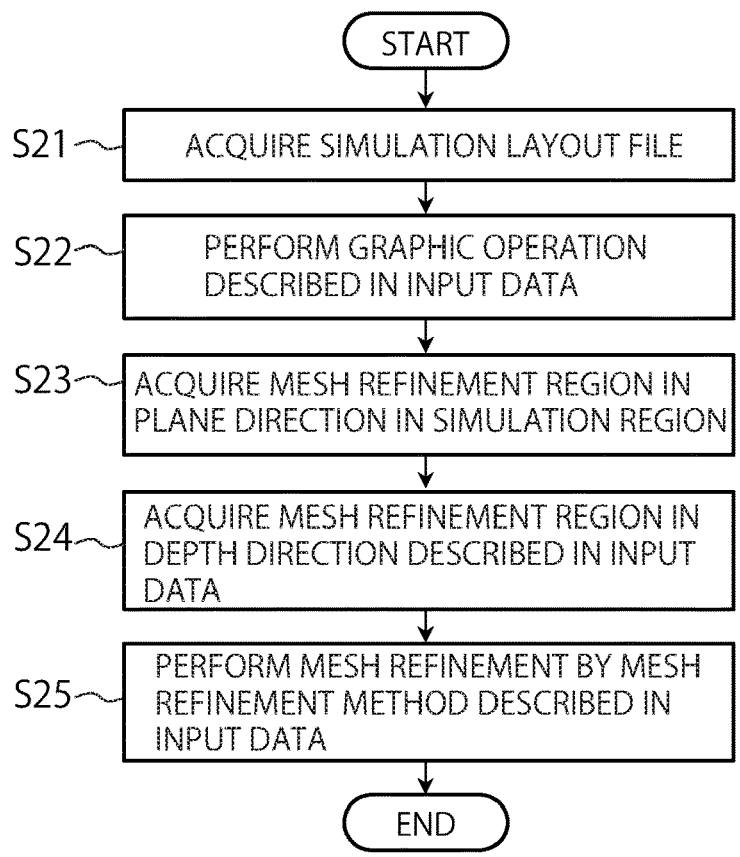
FIG. 8A is a flowchart illustrating algorithm of a mesh refinement.
Figure 8B:
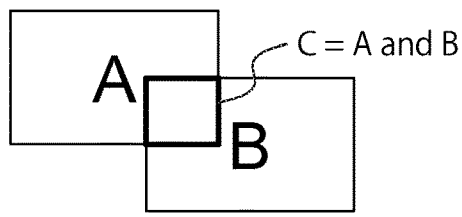
FIG. 8B is a diagram to describe a calculation of a logical product of a graphic A and a graphic B.
Figure 8C:
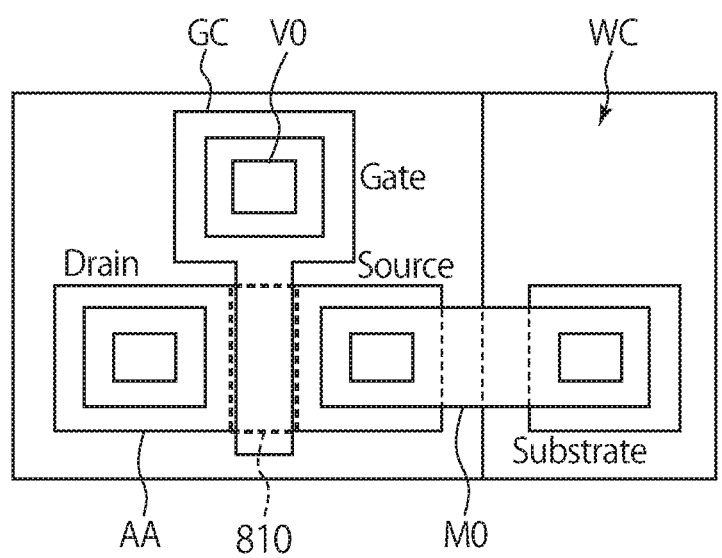
FIG. 8C is a diagram illustrating a region calculated by the logical product of a mask AA and a mask GC.

FIG. 8A is a flowchart illustrating algorithm of the mesh refinement. First, in step S21, the mesh refinement control unit 320 acquires the simulation layout file 164.

Next, in step S22, the graphic operation unit 323 executes, to the graphic information of the simulation layout file 164, the graphic operation processing described in the mesh refinement setting of the process simulation input data 161. In the graphic operation processing, for example, when it is specified to calculate a logical product (AND) of a graphic A and a graphic B in the process simulation input data 161, a graphic C is created as illustrated in FIG. 8B. For example, the region calculated by the logical product of the mask AA and the mask GC in the MOSFET in the layout of FIG. 6B is a region 810 surrounded by a dashed line in FIG. 8C. The region 810 is the region to be a channel of the MOSFET, and the region where the fine mesh is to be set. With the operation, however the shape of the mask is changed, it is possible to determine the region where the fine mesh is to be set, that is, the region where the mesh is to be refined.

Next, in step S23, the plane direction mesh refinement setting processing unit 321 acquires, from the graphic obtained in step S22, a mesh refinement region in the plane direction in the simulation region.

Next, in step S24, the depth direction mesh refinement setting processing unit 322 acquires the mesh refinement region in the depth direction described in the process simulation input data 161.

Next, in step S25, the mesh refinement unit 324 performs the mesh refinement using the mesh refinement region acquired in steps S23 and S24 and the mesh refinement method described in the process simulation input data 161.

The initial mesh setting and the mesh refinement in the process simulation of the semiconductor device is performed as described above.

Here, a TCAD system of a comparative example will be described. In the TCAD system of the comparative example, functions of a layout editor/simulation region setting unit 112X and an initial mesh generation/refinement unit 212X are different from those of the first embodiment. The other configuration is the same as the first embodiment of FIG. 1.

Figure 9:
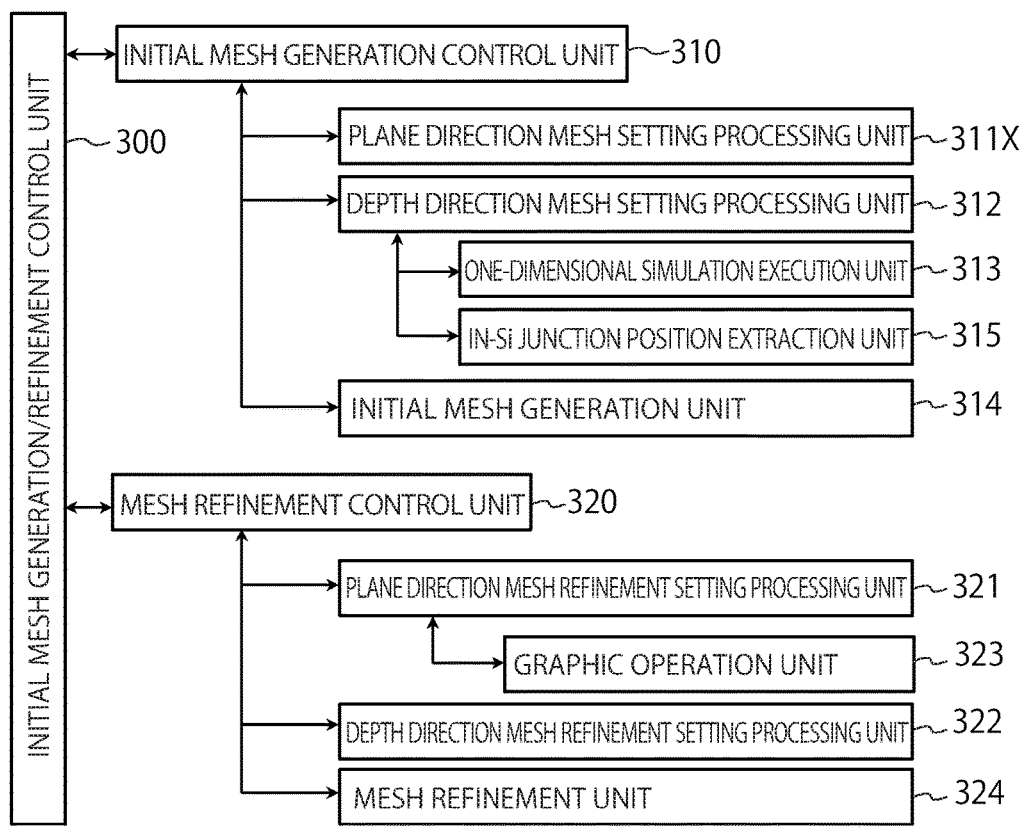
FIG. 9 is a block diagram illustrating a configuration of an initial mesh generation/refinement unit of a comparative example.

FIG. 9 is a block diagram illustrating a configuration of the initial mesh generation/refinement unit 212X of the comparative example. In the initial mesh generation/refinement unit 212X of the comparative example, the simulation layout processing unit 316 of the first embodiment is not provided. Therefore, as described later, the function of the plane direction mesh setting processing unit 311X is also different from that of the first embodiment.

Figure 10:
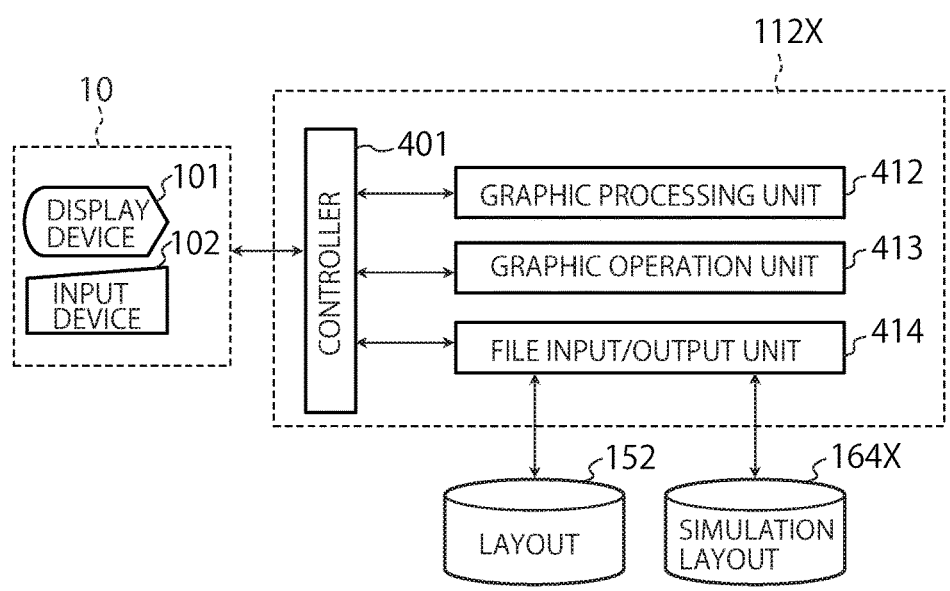
FIG. 10 is a block diagram illustrating a configuration of a layout editor/simulation region setting unit of the comparative example.

FIG. 10 is a block diagram illustrating a configuration of the layout editor/simulation region setting unit 112X of the comparative example. In the layout editor/simulation region setting unit 112X of the comparative example, the mesh setting information processing unit 415 of the first embodiment is not provided. Therefore, a simulation layout file 164X of the comparative example does not include the mesh setting information part of the first embodiment.

Figure 11A:
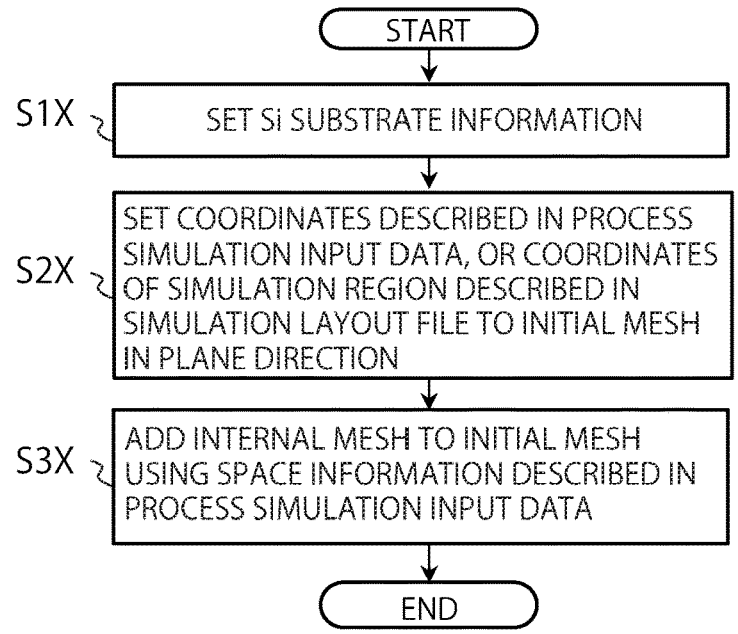
FIG. 11A is a flowchart illustrating algorithm of the initial mesh setting in the plane direction of the comparative example.

FIG. 11A is a flowchart illustrating algorithm of the initial mesh setting in the plane direction of the comparative example. In step SIX of FIG. 11A, the same processing as that in step S1 of the algorithm of the first embodiment of FIG. 6A is performed.

Next, in step S2X, the plane direction mesh setting processing unit 311X sets, to the initial mesh in the plane direction, the coordinates described in the process simulation input data 161, or the coordinates of the simulation region described in the simulation layout file 164X.

Next, in step S3X, the plane direction mesh setting processing unit 311X adds an internal mesh to the above described initial mesh in the plane direction using the space information described in the process simulation input data 161.

Figure 11B:
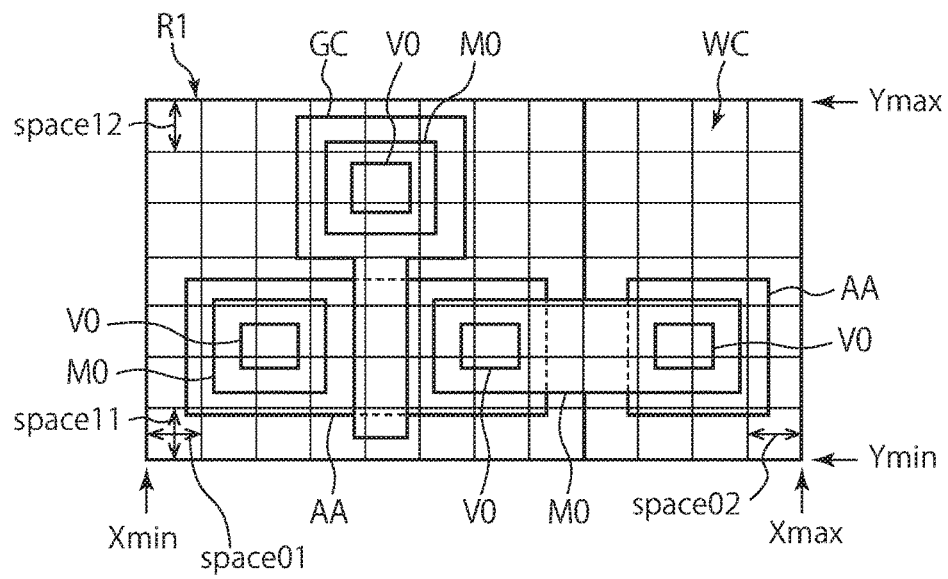
FIG. 11B is a diagram illustrating a shape of the initial mesh of the comparative example.

FIG. 11B illustrates the concrete information processed by the algorithm illustrated in FIG. 11A and the shape of the initial mesh in the case of the same MOSFET as that of the first embodiment. A space01 associated with the coordinate Xmin, a space02 associated with the coordinate Xmax, a space11 associated with the coordinate Ymin, and a space12 associated with the coordinate Ymax are described in the process simulation input data 161. With these data, the initial mesh generation unit 314 generates the initial mesh of FIG. 11B. The interval of the adjacent straight line of the initial mesh is the space01, the space02, the space11, or the space12.

Figure 12:
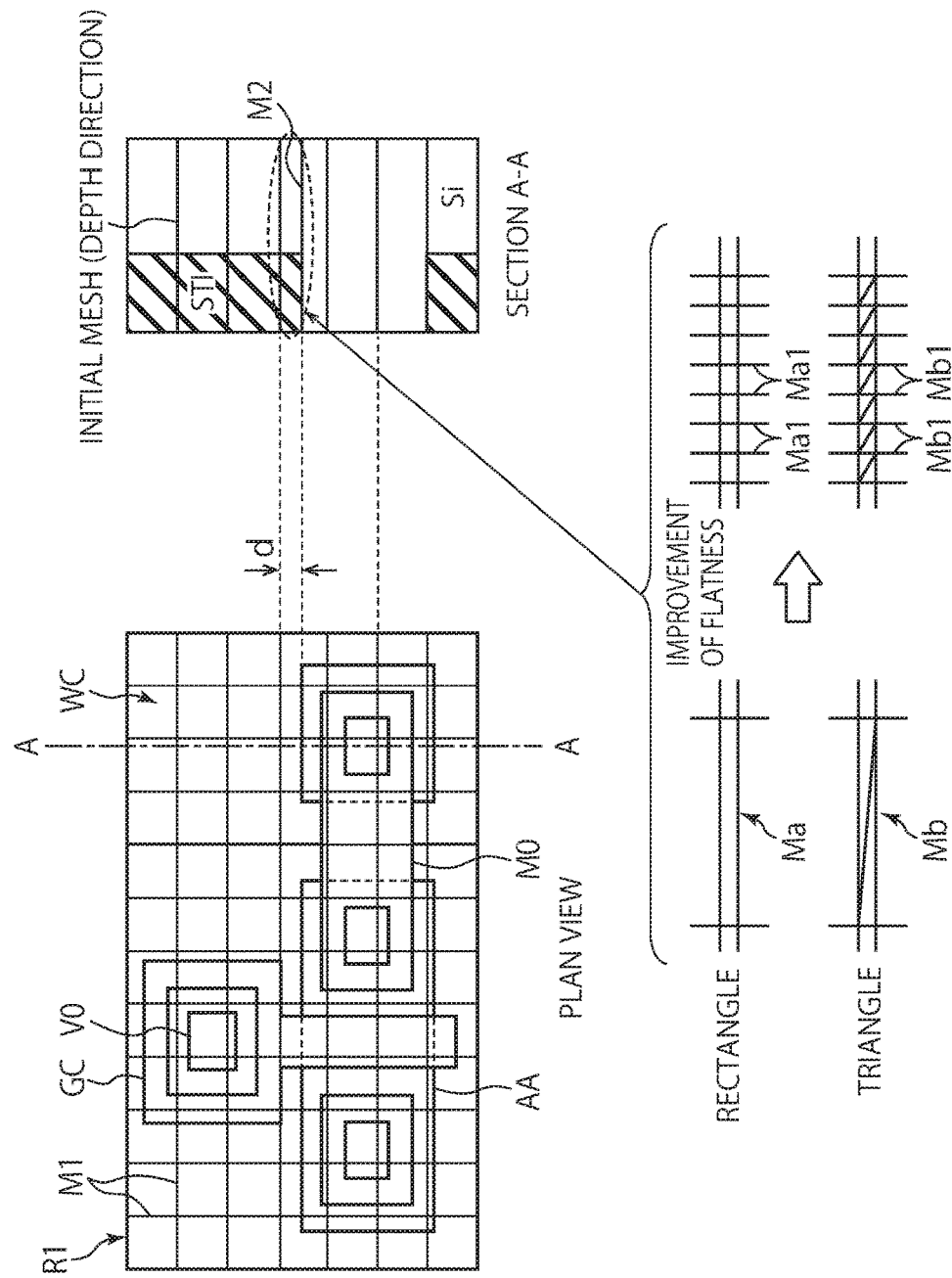
FIG. 12 is a diagram to describe the problem of the initial mesh setting in the plane direction of the comparative example.

In the initial mesh setting in the plane direction of the comparative example, an initial mesh M1 is shifted from the line segment (edge) of the layout as illustrated in FIG. 12, and a new mesh M2 is added to the line segment part of the layout. When a distance d between the new mesh M2 and the initial mesh M1 cannot be ignored, a flat rectangular mesh Ma in the depth direction or a flat triangular mesh Mb in the depth direction is generated at the part. The flat rectangular mesh Ma or the flat triangular mesh Mb is a mesh having a longer length in the depth direction than that in the plane direction. At the part of the flat rectangular mesh Ma or the flat triangular mesh Mb, there is a problem that the numerical calculation accuracy remarkably decreases.

In order to improve the flat rectangular mesh Ma or the flat triangular mesh Mb, meshes Ma1 and Mb1 are newly generated so that the mesh interval in the depth direction is approximately equal to the distance d. However, this makes the number of the fine meshes increase, and the numerical calculation speed remarkably decreases. Furthermore, the time for the mesh generation itself is also required. Therefore, there is a problem that the semiconductor device especially when the three-dimensional simulation is required is not sufficiently designed due to the limitation of time.

In contrast, in the first embodiment, the vertex coordinates of the graphic of the layout is extracted, and the initial mesh in the plane direction passing through the extracted vertex coordinates is generated. Thus, as illustrated in FIG. 6D, it is possible to prevent the initial mesh from shifting from the line segment (edge) of the layout. Therefore, in comparison with FIG. 12 of the comparative example, the generation of the flat rectangular mesh in the depth direction or the flat triangular mesh in the depth direction is suppressed, and it is possible to suppress the deterioration of the numerical calculation accuracy.

Furthermore, there is no need to perform the mesh generation to improve the flat rectangular mesh and the like, and it is possible to suppress the deterioration of the numerical calculation speed. Therefore, when a great deal of calculation, such as especially the three-dimensional simulation, is required, it is possible to efficiently design the semiconductor device.

(Second Embodiment)

In a second embodiment, in addition to the processing of the first embodiment, an appropriate initial mesh is generated on an upper structure of a silicon substrate.

In a TCAD system of the second embodiment, a function of an initial mesh generation/refinement unit 212A of a process simulator 122 is different from that of the first embodiment. Hereinafter, the difference from the first embodiment will be mainly described.

Figure 13:
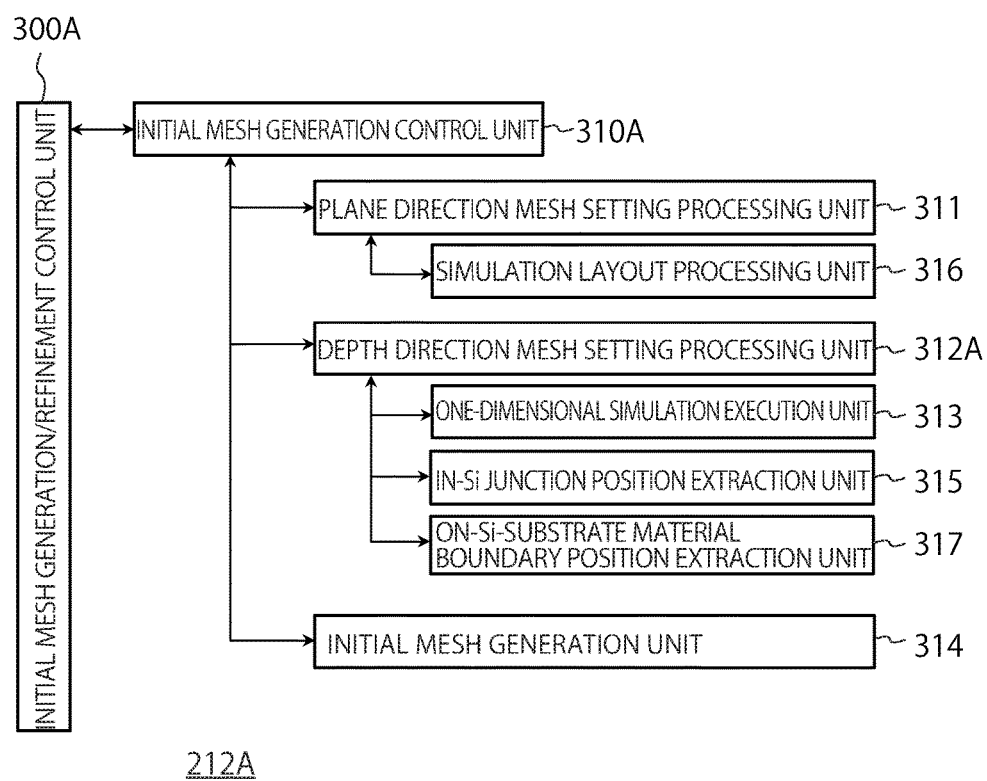
FIG. 13 is a block diagram illustrating a configuration of an initial mesh generation/refinement unit of a process simulator according to a second embodiment.

FIG. 13 is a block diagram illustrating a configuration of the initial mesh generation/refinement unit 212A of a process simulator according to the second embodiment. The difference from the configuration of the initial mesh generation/refinement unit 212 of the first embodiment of FIG. 3 is that an on-silicon-substrate material boundary position extraction unit (hereinafter, referred to as a material boundary position extraction circuitry) 317 is added. In FIG. 13, the same reference sign is assigned to a configuration part common to FIG. 3. Note that, in FIG. 13, a mesh refinement control unit 320 and the like, which are related to a mesh refinement, is the same as that of the first embodiment of FIG. 3, and the illustration thereof is omitted.

In the present embodiment, a plurality of one-dimensional simulation positions is described in a simulation layout file 164.

A one-dimensional simulation execution unit 313 executes a process simulation in the depth direction at the one-dimensional simulation positions described in the simulation layout file 164.

The material boundary position extraction unit 317 extracts, from the result of the process simulation in the depth direction by the one-dimensional simulation execution unit 313, a material boundary position in the depth direction of the upper silicon substrate (the structure on the semiconductor substrate) of the semiconductor device.

A depth direction mesh setting processing unit (depth direction mesh setting processing circuitry) 312A performs the setting to generate a mesh at the material boundary position of the upper silicon substrate using the information of the extracted material boundary position.

An initial mesh generation/refinement control unit 300A and an initial mesh generation control unit 310A transmit the necessary information to the depth direction mesh setting processing unit 312A.

A simulator unit 220 of the process simulator 122 executes the process simulation based on process simulation input data 161, a layout, the initial mesh in the plane direction, and the initial mesh in the depth direction.

Figure 14:
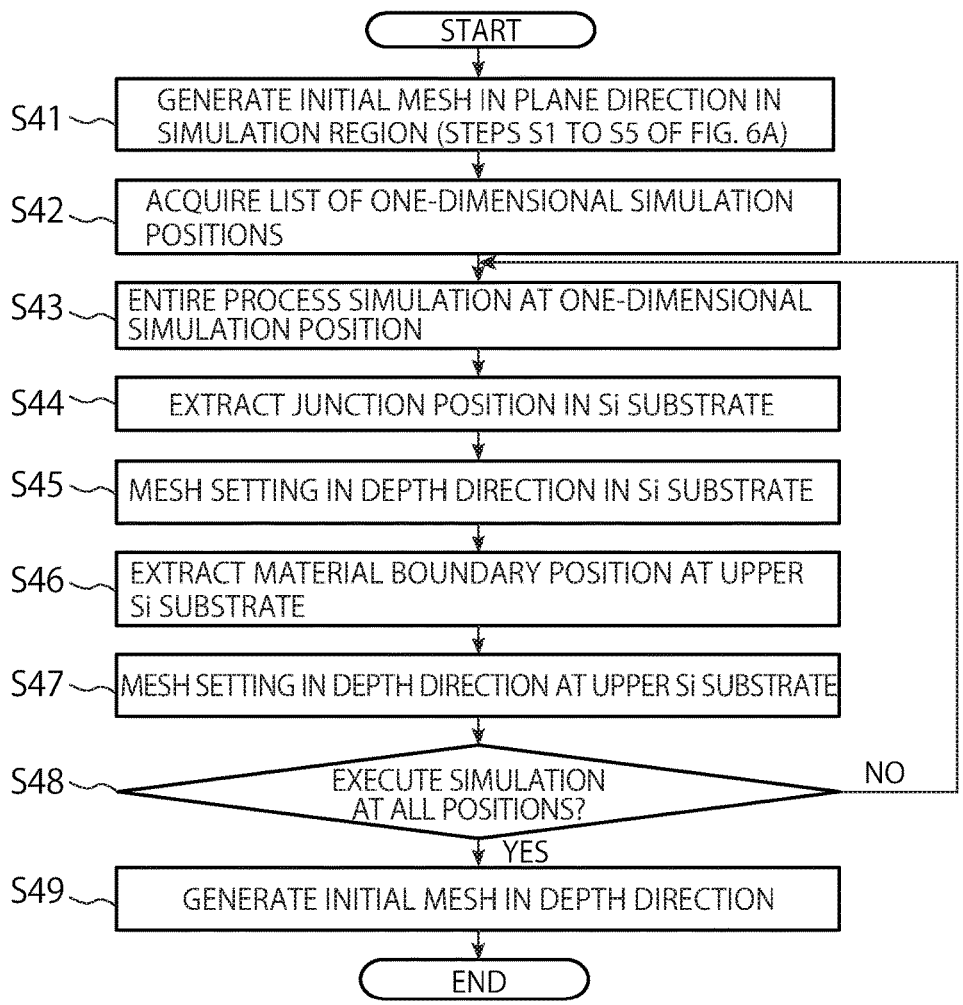
FIG. 14 is a flowchart illustrating algorithm of the initial mesh generation of the initial mesh generation/refinement unit of FIG. 13.

FIG. 14 is a flowchart illustrating algorithm of the initial mesh generation of the initial mesh generation/refinement unit 212A. First, in step S41, the processing of steps S1 to S5 of FIG. 6A of the first embodiment is performed, and the initial mesh generation in the plane direction in the simulation region is performed.

Next, in step S42, the initial mesh generation control unit 310A acquires, from the one-dimensional simulation positions described in the simulation layout file 164, the one-dimensional simulation positions in the targeted simulation region as a list.

Next, in step S43, the one-dimensional simulation execution unit 313 executes the entire process simulation in the depth direction (process simulation) at one of the one-dimensional simulation positions in the list acquired in step S42.

Next, in step S44, an in-silicon junction position extraction unit (in-silicon junction position extraction circuitry) 315 extracts, from the result of the one-dimensional simulation, a junction position in the silicon substrate. In step S44, the maximum concentration position or the like may be extracted.

Next, in step S45, the depth direction mesh setting processing unit 312A performs, based on the extracted junction position, a mesh setting in the depth direction in the silicon substrate.

Next, in step S46, the material boundary position extraction unit 317 extracts, from the result of the one-dimensional simulation, the material boundary position of the upper silicon substrate.

Next, in step S47, the depth direction mesh setting processing unit 312A performs, based on the extracted material boundary position, the mesh setting in the depth direction at the upper silicon substrate.

Next, in step S48, the initial mesh generation control unit 310A determines whether or not the processing of the list of the one-dimensional simulation positions acquired in step S42 is ended. Then, the processing of steps S43 to S48 is repeated until the processing of the list of the one-dimensional simulation positions is ended, and the processing proceeds to step S49.

In step S49, the initial mesh generation unit 314 generates, based on the mesh setting set in steps S45 and S47, the initial mesh in the depth direction. In other words, the initial mesh in the depth direction passing through the extracted material boundary position is generated. Thereafter, the processing is terminated.

Figure 15A:
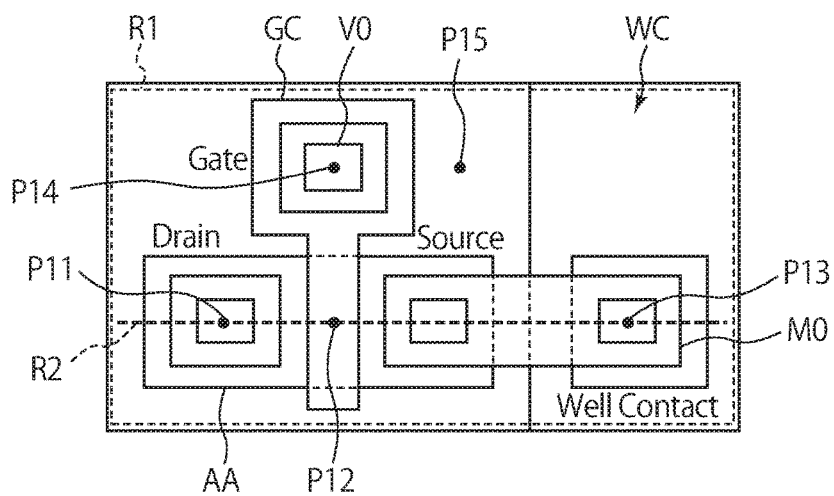
FIG. 15A is a diagram illustrating a three-dimensional simulation region, a two-dimensional simulation region, and one-dimensional simulation positions.
Figure 15B:
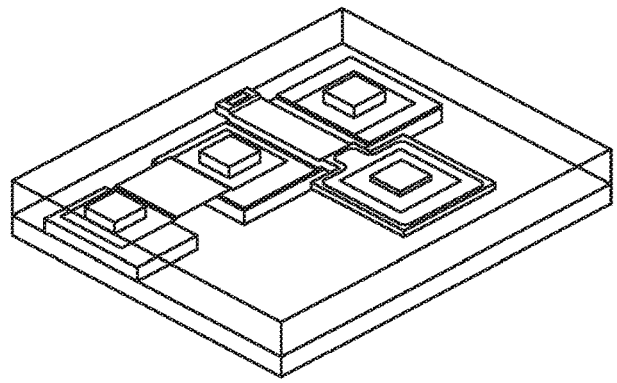
FIG. 15B is a perspective view illustrating the result obtained by executing the three-dimensional simulation in the three-dimensional simulation region.
Figure 15C:
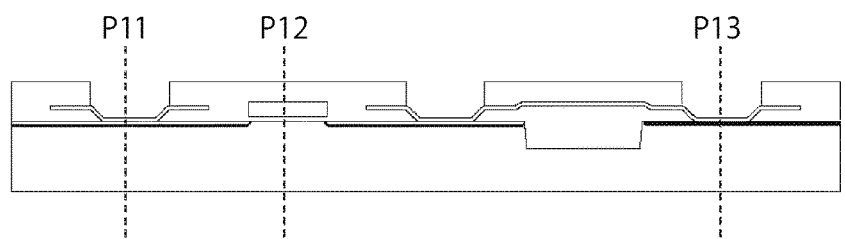
FIG. 15C is a diagram illustrating the result obtained by executing the two-dimensional simulation in the two-dimensional simulation region.

In this manner, the main difference from FIG. 7A of the first embodiment is that steps S46 and S47 to perform the processing related to the upper silicon substrate is added. FIGS. 15A to 15D are diagrams to describe the mesh in the depth direction generated by the processing of the second embodiment. FIG. 15A is a diagram illustrating a three-dimensional simulation region R3 to execute a three-dimensional simulation, a two-dimensional simulation region R2 to execute a two-dimensional simulation, and one-dimensional simulation positions P11 to P15 for the mesh setting in the depth direction. FIG. 15B is a perspective view illustrating the result obtained by executing the three-dimensional simulation in the three-dimensional simulation region R3. FIG. 15C is a diagram illustrating the result obtained by executing the two-dimensional simulation in the two-dimensional simulation region R2.

Figure 15D:
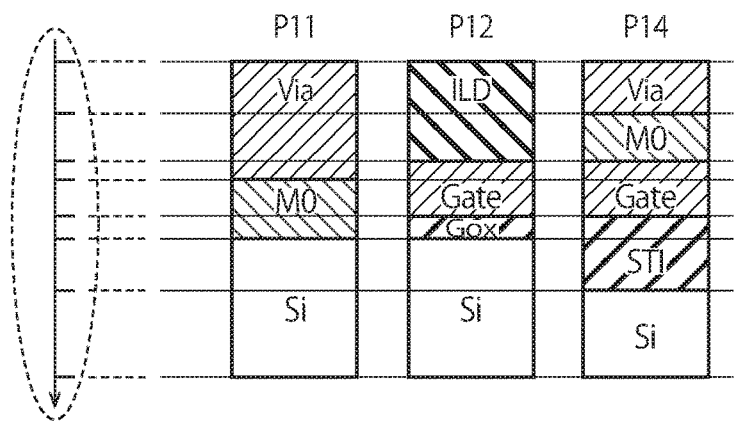
FIG. 15D is a diagram illustrating the mesh in the depth direction generated by the algorithm illustrated in FIG. 14 at the one-dimensional simulation positions in FIG. 15A.

FIG. 15D is a diagram illustrating the mesh in the depth direction generated by the algorithm illustrated in FIG. 14 at the one-dimensional simulation positions P11, P12, and P14 in FIG. 15A. By the processing of steps S46 and S47 of FIG. 14, the mesh is generated at the material boundary position of the upper structure of the silicon substrate as illustrated in FIG. 15D. In other words, the mesh is not shifted from the material boundary position of the upper structure. In the example of FIG. 15D, the material boundary position at the one-dimensional simulation position P11 is a boundary position between a via and a metal wiring (M0). The material boundary position at the one-dimensional simulation position P12 is a boundary position between an interlayer insulating film (ILD) and a gate, and a boundary position between the gate and a gate oxidation film (Gox). The material boundary position at the one-dimensional simulation position P14 is a boundary position between a via and a metal wiring (M0), a boundary position between the metal wiring (M0) and a gate, and a boundary position between the gate and a trench (STI).

Note that, in order to clarify the drawings, the mesh at the junction position in the silicon substrate is not illustrated in FIG. 15D.

Figure 16A:
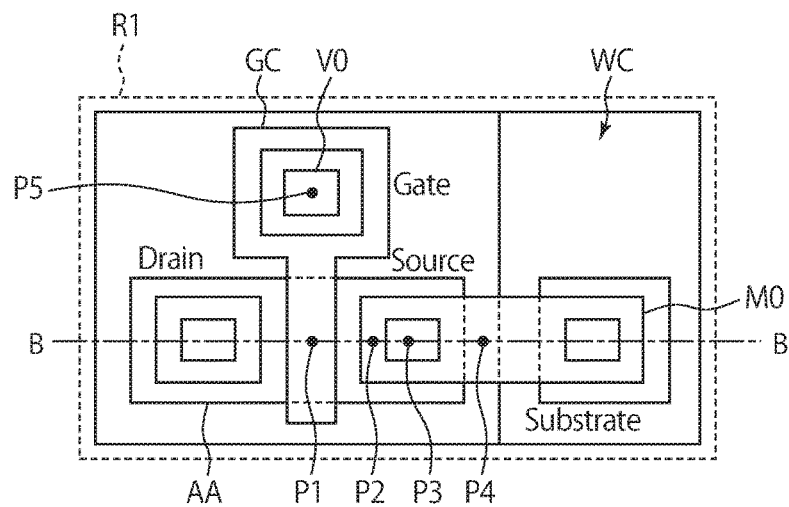
FIG. 16A is a plan view illustrating an example of a layout of a MOSFET.

Here, with reference to FIGS. 16A to 16C, the problem of the initial mesh setting in the depth direction in the first embodiment will be described. In the initial mesh setting in the depth direction in the first embodiment, the mesh setting in the silicon substrate is only performed, and there is a problem that the upper structure of the upper layer above the silicon substrate is not taken into account. The setting is sufficient in the case of the two-dimensional simulation in the active region of the single element. However, the upper structure is complicated in the case of the three-dimensional simulation, and it is required to set the initial mesh taking the upper structure into account in order to improve the simulation accuracy.

Here, it is considered that, in the first embodiment, the space is specified similarly to the initial mesh setting in the plane direction of the comparative example and the initial mesh is generated at the upper structure. In this case, the mesh is shifted from the material boundary position of the upper structure, and a mesh is newly added to the shifted part. Thus, for example, in a single MOSFET illustrated in FIG. 16A, a low quality mesh illustrated in FIG. 16C is generated at the upper structure. FIG. 16C is a diagram illustrating the mesh in the cross-sectional view along the line B-B of FIG. 16A. FIG. 16B is a cross-sectional view along the line B-B of FIG. 16A. The low quality mesh indicates the fine mesh generated in an insulating film 100 and the like in which the fine mesh is originally unnecessary. In this case, there is a problem that the simulation accuracy deterioration, or simulation speed deterioration of the device simulation occurs.

Furthermore, in order to take the upper structure into account, the one-dimensional simulation is required to be executed at a plurality of points of the different upper structures. In other words, it is required to execute the one-dimensional simulation at at least four points of the points P1 to P4 of FIG. 16A in the two-dimensional simulation, and the one-dimensional simulation at at least five points of the points P1 to P5 in the three-dimensional simulation. However, in the first embodiment, the one-dimensional simulation only handles the point in the silicon substrate, and there is a problem that the simulation is limited to be executed at the three points of points P1, P2, and P4 which are the different structures in the silicon substrate.

In contrast, in the second embodiment, the material boundary position in the depth direction of the structure on the silicon substrate is extracted from the result of the process simulation in the depth direction, and the initial mesh in the depth direction passing through the extracted material boundary position is generated. In other words, in the initial mesh setting in the depth direction, the upper structure of the upper layer above the silicon substrate is taken into account as well as the junction position in the silicon substrate as in the first embodiment. Furthermore, the one-dimensional simulation at at least four points of the one-dimensional simulation positions P11 to P14 in FIG. 15A is executed in the two-dimensional simulation, and the one-dimensional simulation at at least five points of the one-dimensional simulation positions P11 to P15 is executed in the three-dimensional simulation.

Figure 16B:
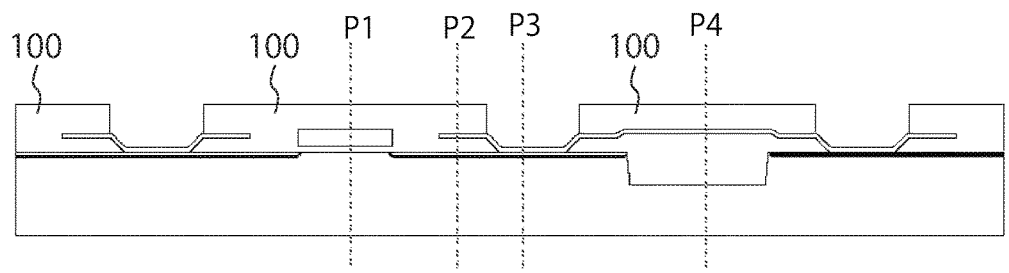
FIG. 16B is a cross-sectional view along the line B-B of FIG. 16A.
Figure 16C:
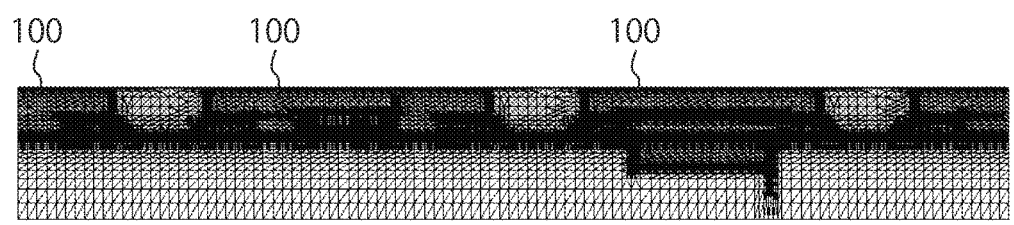
FIG. 16C is a diagram illustrating the mesh in the cross-sectional view along the line B-B of FIG. 16A.

Thus, in the case of the single MOSFET, the low quality mesh illustrated in FIG. 16B is not generated at the upper structure above the silicon substrate. Therefore, when the upper structure is complicated as in the three-dimensional simulation, it is possible to suppress the simulation accuracy deterioration and the simulation speed deterioration of the device simulation. In other words, it is possible to efficiently design the semiconductor device.

(Third Embodiment)

In a third embodiment, in addition to the processing of the second embodiment, mesh refinement in a selected region is performed.

In a TCAD system of the third embodiment, a function of an initial mesh generation/refinement unit 212B of a process simulator 122 is different from that of the second embodiment. Hereinafter, the difference from the second embodiment will be mainly described.

Figure 17:
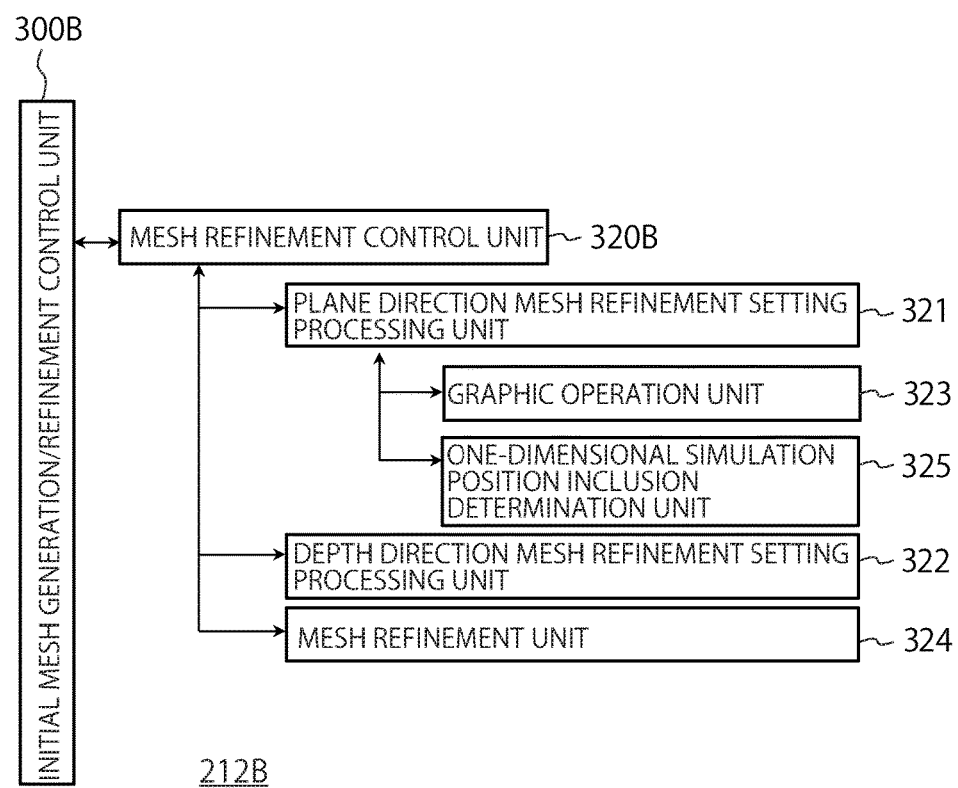
FIG. 17 is a block diagram illustrating a configuration of an initial mesh generation/refinement unit of a process simulator according to a third embodiment.

FIG. 17 is a block diagram illustrating a configuration of the initial mesh generation/refinement unit 212B of the process simulator 122 according to the third embodiment. The difference from the initial mesh generation/refinement unit 212A of the second embodiment of FIG. 13 is that a one-dimensional simulation position inclusion determination unit (graphic selection unit) 325 is added. In FIG. 17, the same reference sign is assigned to a configuration part common to FIG. 13. Note that, in FIG. 17, an initial mesh generation control unit 310A and the like, which are related to the initial mesh generation, are the same as those in FIG. 13 and the illustration thereof is omitted.

The engineer specifies, via a man-machine interface unit 10, any one of one-dimensional simulation positions described in a simulation layout file 164.

When a graphic operation unit 323 generates a plurality of graphics, the one-dimensional simulation position inclusion determination unit 325 determines whether or not the one-dimensional simulation position described in the simulation layout file 164 and specified in advance by the engineer is included in each of the graphics, and selects, from the graphics, the graphic including the one-dimensional simulation position specified in advance.

A plane direction mesh refinement setting processing unit (plane direction mesh refinement setting processing unit) 321 sets a mesh refinement region in the plane direction at the position of the graphic selected by the one-dimensional simulation position inclusion determination unit 325.

An initial mesh generation/refinement control unit 300B and a mesh refinement control unit 320B transmit, to the plane direction mesh refinement setting processing unit 321, the instruction and the necessary information.

Figure 18A:
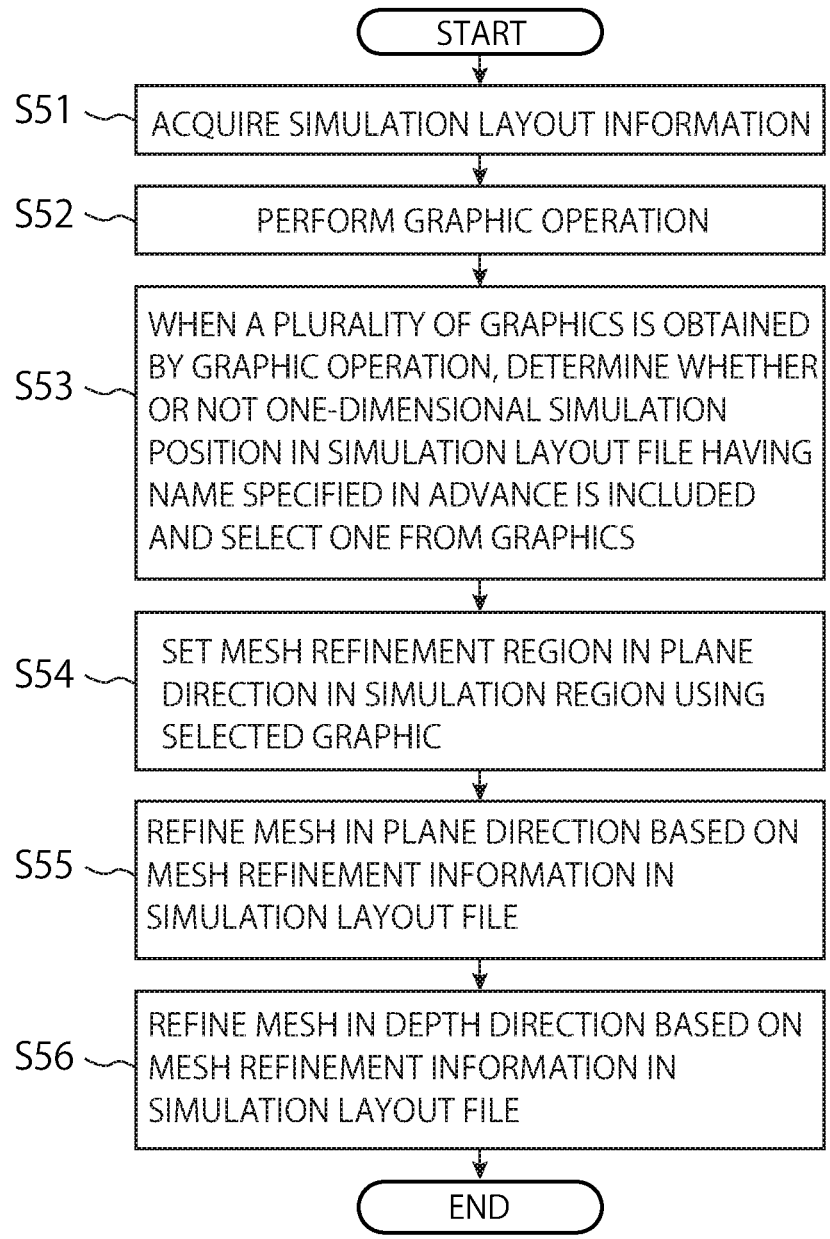
FIG. 18A is a flowchart illustrating algorithm of the mesh refinement according to the third embodiment.

FIG. 18A is a flowchart illustrating algorithm of the mesh refinement according to the third embodiment. FIG. 18A corresponds to FIG. 8A.

Similarly to the algorithm of the mesh refinement of the first embodiment illustrated in FIG. 8A, first, a simulation layout is acquired in step S51, and graphic operation processing described in a process simulation input data 161 is performed in step S52. More specifically, in step S52, the graphic operation unit 323 performs, to the graphic of the layout (first graphic), the graphic operation described in the process simulation input data 161 and generates a new graphic (second graphic). The graphic operation includes, for example, logical product operation.

Next, in step S53, when a plurality of graphics (polygons) is obtained by the graphic operation in step S52, the one-dimensional simulation position inclusion determination unit 325 determines whether or not the one-dimensional simulation position in the simulation layout file 164 specified by the engineer in advance is included in each of the graphics and selects one from the graphics.

Next, in step S54, the plane direction mesh refinement setting processing unit 321 sets the mesh refinement region in the plane direction in the simulation region using the selected graphic. When one graphic is obtained by the graphic operation in step S52, the mesh refinement region is only required to be set using the obtained graphic.

Next, in step S55, the mesh refinement unit 324 refines, based on mesh refinement information in the simulation layout file 164, the mesh in the plane direction in the mesh refinement region in the plane direction in the middle of the process simulation.

Next, in step S56, the mesh refinement unit 324 refines the mesh in the depth direction based on the mesh refinement information in the simulation layout file 164.

Here, as the information obtained from the simulation layout file 164 in steps S53 to S56, the information described in the process simulation input data 161 may be used for the case in which the exception processing or the like is executed.

Figure 18B:
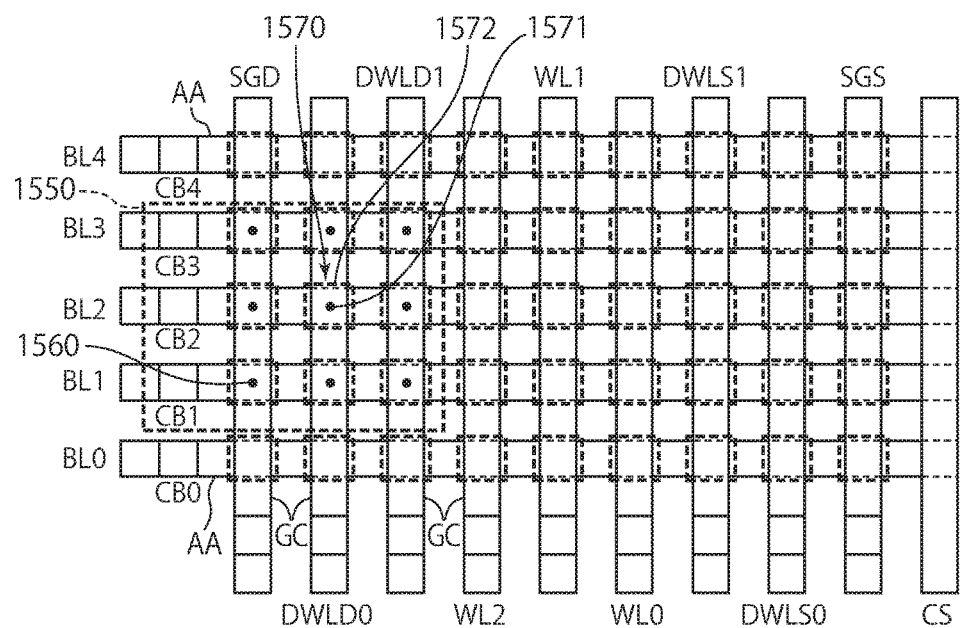
FIG. 18B is a diagram illustrating a three-dimensional simulation region and one-dimensional simulation positions set to a simulation layout of a NAND cell array.

FIG. 18B illustrates a three-dimensional simulation region 1550 and one-dimensional simulation positions 1560 and 1571 set to a simulation layout of a NAND cell array. With only the graphic operation of a mask AA and a mask GC, a plurality of regions is generated. However, for example, a mesh refinement region 1572 of a cell transistor 1570 which is an intersection of a bit line BL2 and a word line DWLD0 is the region obtained by the graphic operation of the mask AA and the mask GC, and determined as one region based on the condition including the one-dimensional simulation position 1571. In this manner, by specifying the one-dimensional simulation position in advance, it is possible to determine the mesh refinement region as one.

Figure 19A:
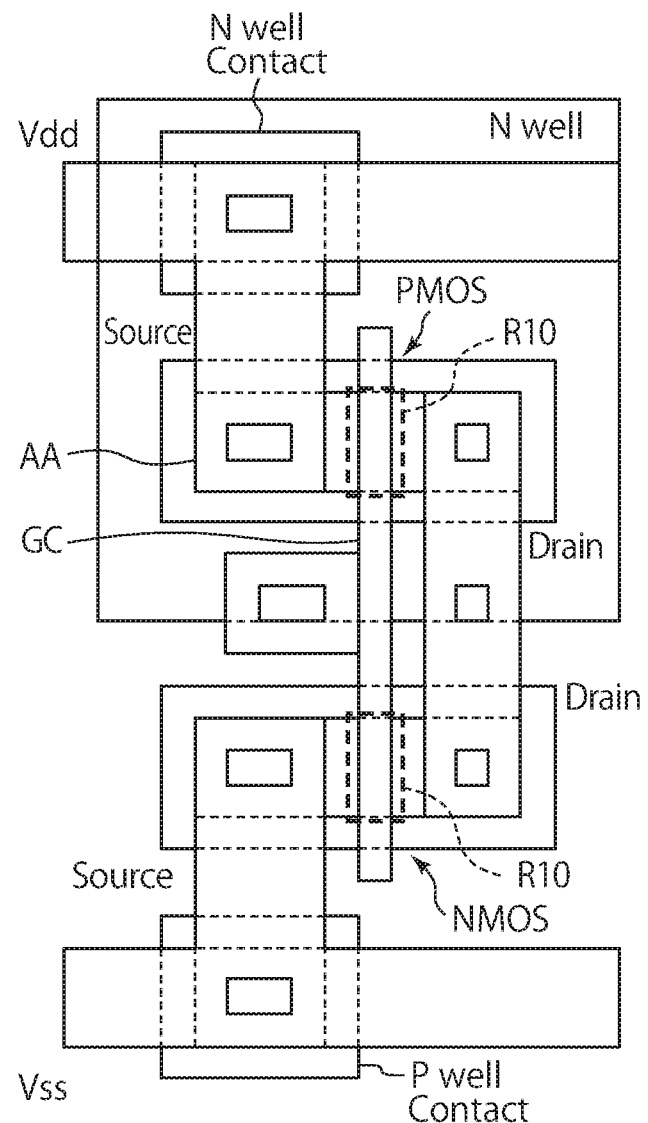
FIG. 19A is a diagram illustrating an example of a layout of a CMOS inverter.
Figure 19B:
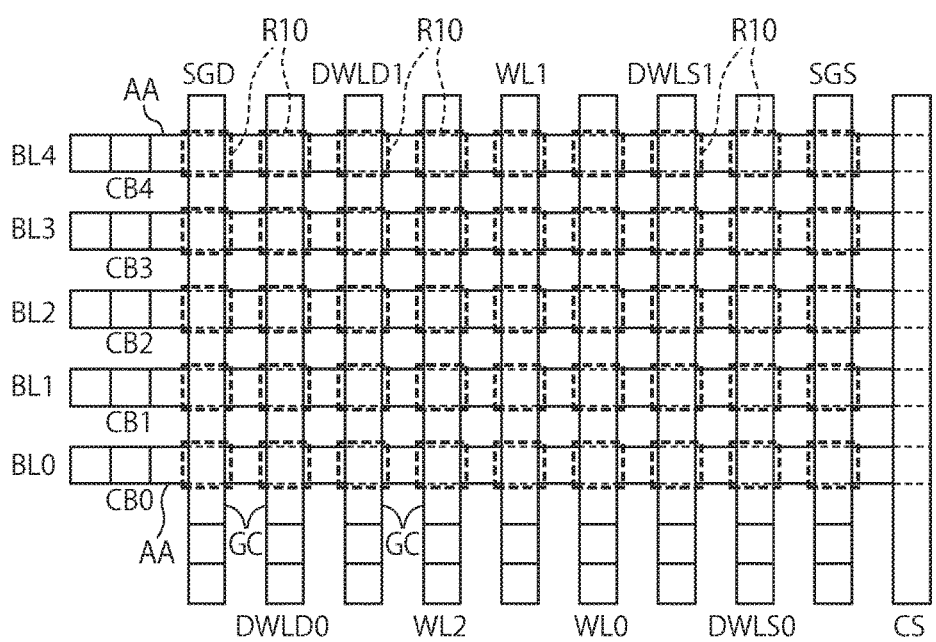
FIG. 19B is a diagram illustrating an example of a layout of a NAND cell array.

Here, with reference to FIGS. 19A and 19B, the problem of the mesh refinement of the first embodiment will be described. FIG. 19A illustrates an example of a layout of a CMOS inverter, and FIG. 19B illustrates an example of a layout of a NAND cell array. As described above, in the mesh refinement of the first embodiment, although AND graphic operation of the mask AA and the mask GC is performed in order to specify the region where the fine mesh is to be set, a plurality of regions R10 is obtained by performing the graphic operation in the example illustrated in FIG. 19A and 19B, and there is a problem that the regions R10 cannot be specified to one.

In the example of FIG. 19A, although channel widths of a PMOS transistor and an NMOS transistor are the same, these channel widths are different due to the difference of mobility or reasons in the design in many cases. When the channel widths are different, the NMOS transistor and the PMOS transistor are required to perform the different mesh refinement, and the regions R10 are required to be specified to one. In the case of the layout of the CMOS inverter, the regions R10 can be specified to one by performing the AND operation of an N-well mask or a contact mask in addition to the AND operation of the mask AA and the mask GC. However, in the case in which the difference or the size variations of a select gate (SG) part and a cell part of the NAND cell array illustrated in FIG. 19B is handled, or in the case of, for example, an SRAM (not illustrated), the regions R10 cannot be specified to one only with the existing mask. In this case, in the first embodiment, it is required to define a new mask to specify the regions R10 to one, and there is a problem that it takes much time and labor in the case of the NAND cell array of FIG. 19B.

In contrast, in the third embodiment, when a plurality of graphics is generated, the graphic including the one-dimensional simulation position specified in advance is selected. Thus, as the layout of the NAND cell array illustrated in FIG. 19B, even when a plurality of regions (graphics) is obtained by the AND graphic operation of the mask AA and the mask GC, the mesh refinement regions can be specified to one, and it is possible to perform the mesh refinement setting different from each of the mesh refinement regions. Thus, in the case in which the difference of the select gate part and the cell part or the size variation of the cell transistor of the NAND cell array illustrated in FIG. 19B is handled, it is possible to generate an excellent mesh.

Furthermore, the engineer is only required to specify one point of the one-dimensional simulation position, which does not require much take and labor, and it is possible to efficiently design the semiconductor device.

Moreover, in comparison with the case in which the mask is added to specify the regions to one, the one-dimensional simulation position has less data amount and is easy to determine.

Note that, in the third embodiment, the material boundary position extraction unit 317 of the second embodiment may not be provided. In other words, in addition to the processing of the first embodiment, the mesh refinement of the selected region may be performed.

(Fourth Embodiment)

In a fourth embodiment, in addition to the processing of the first embodiment, the selected electrical characteristics is accurately extracted.

Figure 20:
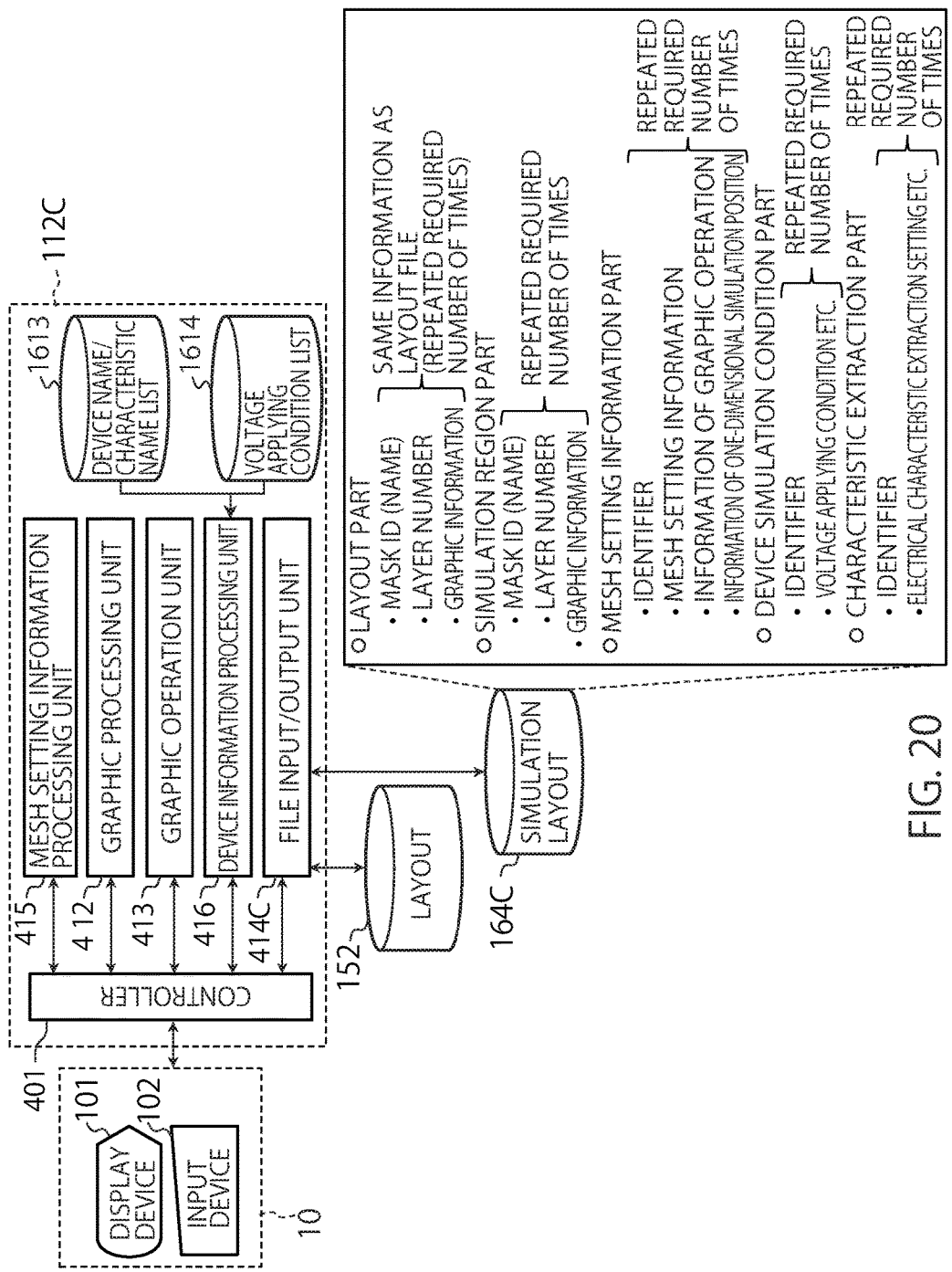
FIG. 20 is a block diagram illustrating a configuration of a layout editor/simulation region setting unit according to a fourth embodiment.

FIG. 20 is a block diagram illustrating a configuration of a layout editor/simulation region setting unit 112C according to the fourth embodiment. In FIG. 20, the same reference sign is assigned to a configuration part common to FIG. 4, and the difference will be mainly described below.

The layout editor/simulation region setting unit 112C includes, in addition to the configuration of the first embodiment of FIG. 4, a device information processing unit (device information processing circuitry) 416, a device name/characteristic name list file 1613, and a voltage applying condition list file 1614.

The device name/characteristic name list file 1613 includes a list of a device name and a device characteristic name of a target to extract electrical characteristics in a semiconductor device.

For example, the device name/characteristic name list file 1613 includes lists of MOSFET normal characteristics, MOSFET contact resistance, MOSFET hot-carrier characteristics, gate depletion in the MOSFET, leak current caused by the silicon insulating film in the MOSFET, adjacent element influence in the MOSFET, and the like illustrated in FIGS. 22A to 22F. As illustrated in FIGS. 22A to 22F, a region R20 or a line segment L1 where a mesh is to be refined is different from each device characteristics.

The device information processing unit 416 associates, in accordance with the engineer's instruction (information input by a man-machine interface unit 10) via an input device 102 and a display device 101, necessary information for a simulation of the semiconductor device under a control of the controller 401. More specifically, the device information processing unit 416 associates the device name and device characteristic name in the device name/characteristic name list file 1613, a voltage applying condition of the device characteristic in the voltage applying condition list file 1614, mesh setting information (mesh refinement setting), information of graphic operation, information of a one-dimensional simulation position, and an electrical characteristic extraction setting of the device characteristic. The graphic operation is used to set a mesh refinement region to refine the mesh and the operation for a logical product of the graphic of the layout and the like. The one-dimensional simulation position is used to select one graphic when a plurality of graphics is generated by the graphic operation.

A file input/output unit 414C writes, to a simulation layout file 164C, the information of the layout of the semiconductor device and the information associated by the device information processing unit 416.

The simulation layout file 164C further includes, in addition to the layout part, the simulation region part, and the mesh setting information part of the first embodiment, a device simulation condition part and a characteristic extraction part.

The mesh setting information part includes, in addition to the identifier of the simulation region and the mesh setting information (not illustrated) of the first embodiment, a plurality of sets of the identifier, the mesh setting information (mesh refinement setting), the information of graphic operation, and the information of the one-dimensional simulation position. The device simulation condition part includes a plurality of pairs of the identifier and the voltage applying condition. The characteristic extraction unit includes a plurality of pairs of the identifier and the electrical characteristic extraction setting.

By using the identifier, the mesh setting information, the voltage applying condition, the information of the graphic operation, the information of the one-dimensional simulation position, and the electrical characteristic extraction setting are associated with each of the device names and the device characteristic names.

Figure 21:
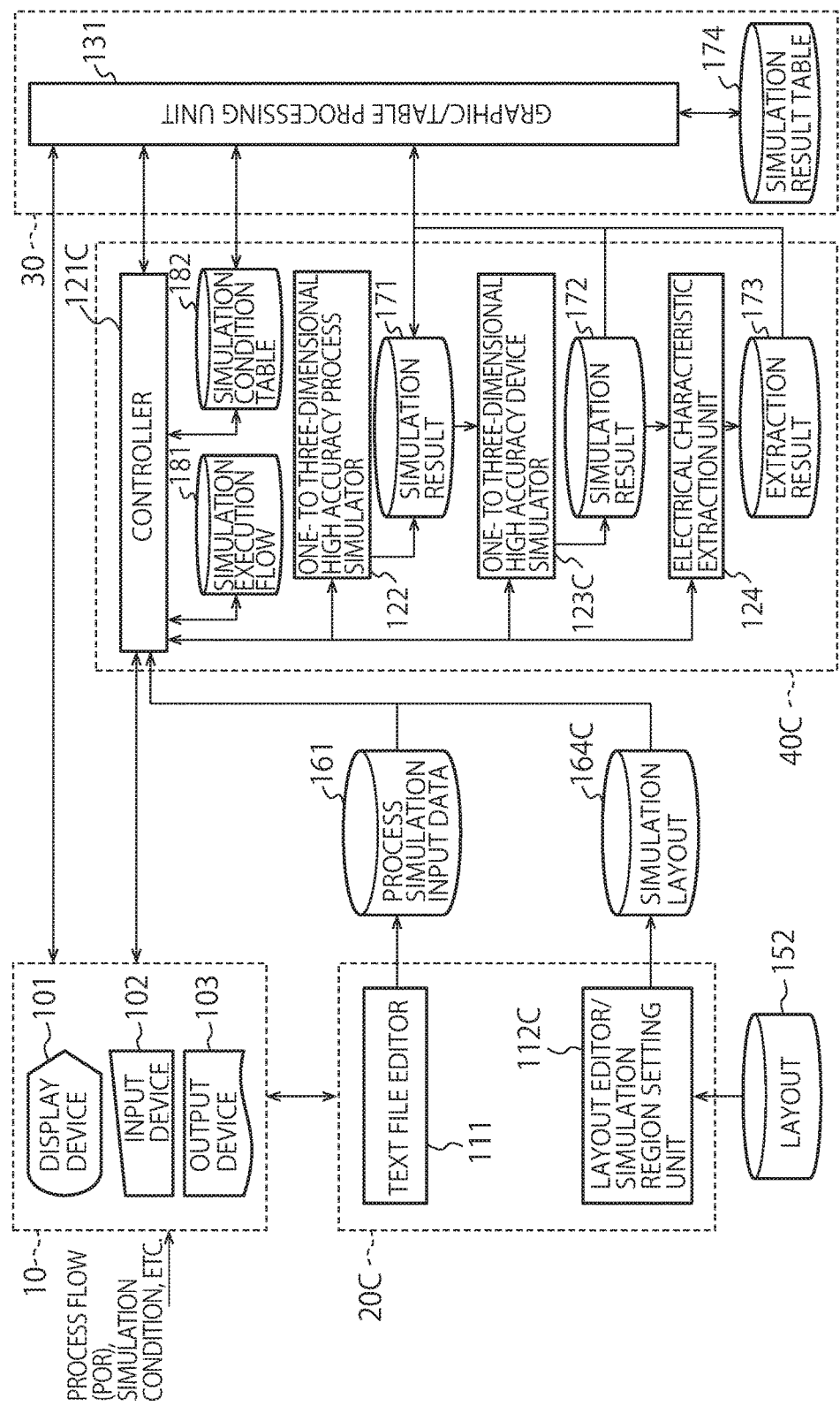
FIG. 21 is a block diagram illustrating a configuration of a TCAD system according to the fourth embodiment.
Figure 22A:
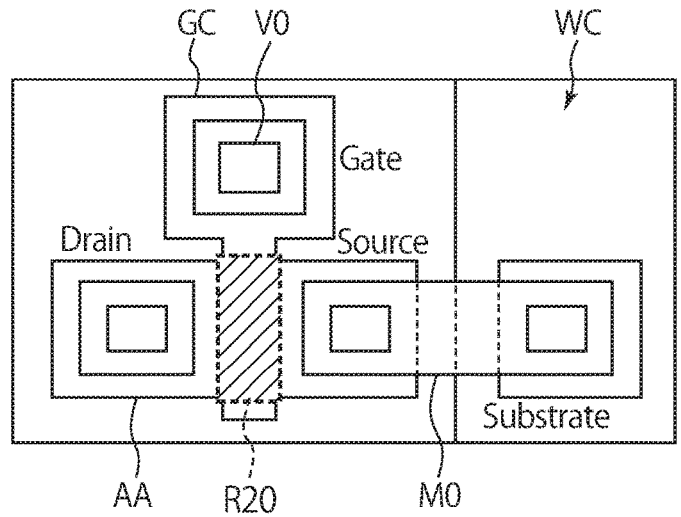
FIG. 22A is a diagram illustrating a region where a mesh is to be refined when MOSFET normal characteristics and the like is extracted.
Figure 22B:
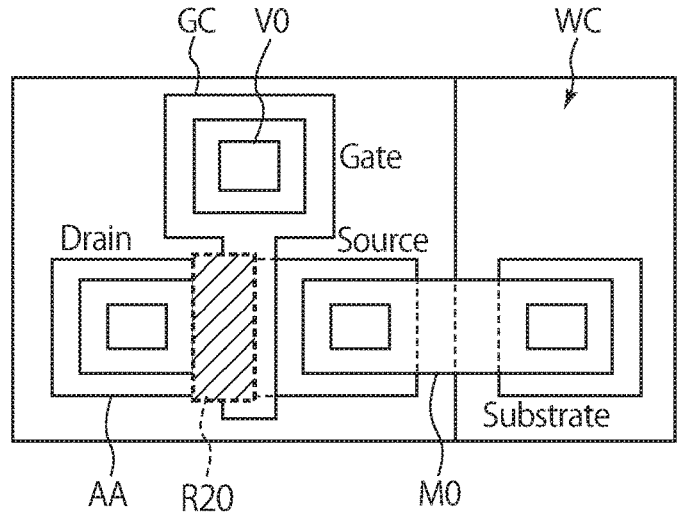
FIG. 22B is a diagram illustrating a region where the mesh is to be refined when MOSFET hot-carrier characteristics is extracted.
Figure 22C:
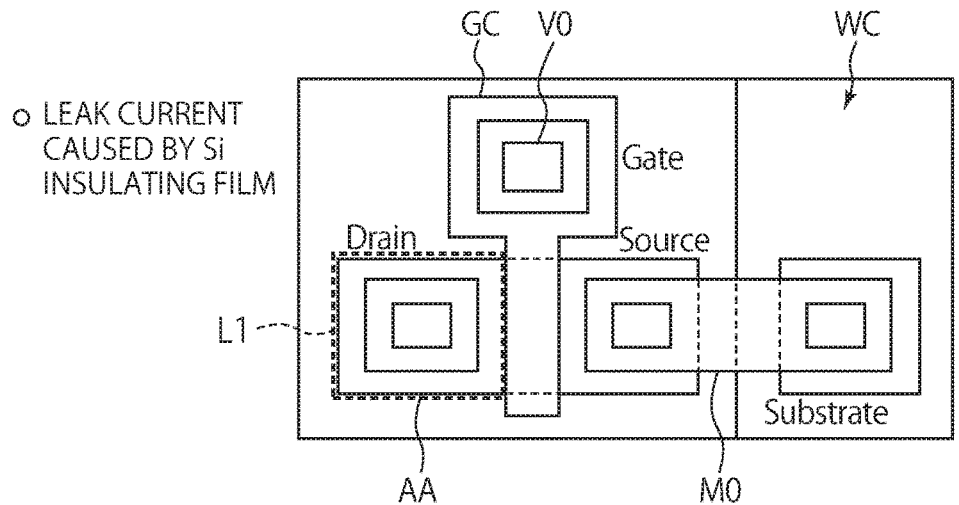
FIG. 22C is a diagram illustrating a line segment where a mesh is to be refined when a leak current caused by the silicon insulating film in the MOSFET is extracted.
Figure 22D:
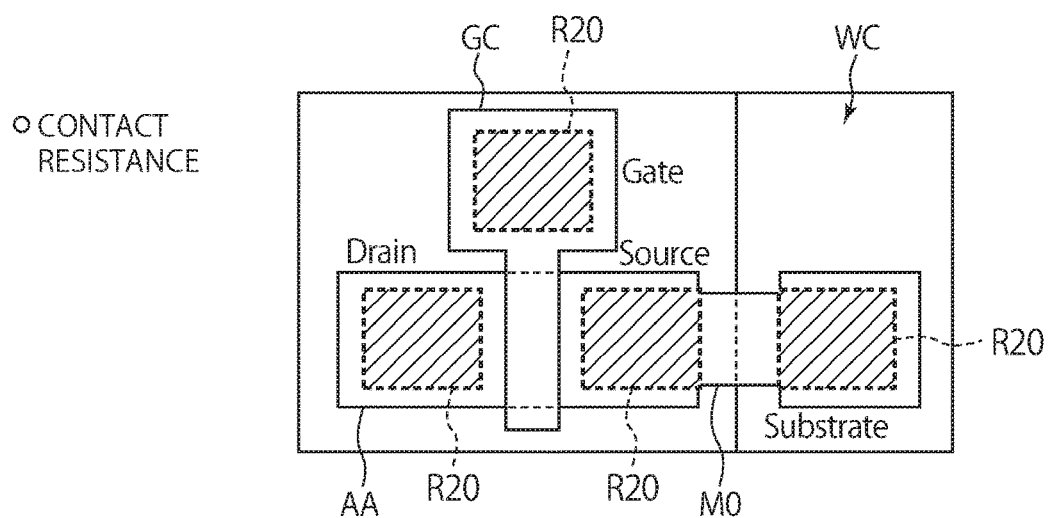
FIG. 22D is a diagram illustrating a region where a mesh is to be refined when a MOSFET contact resistance is extracted.
Figure 22E:
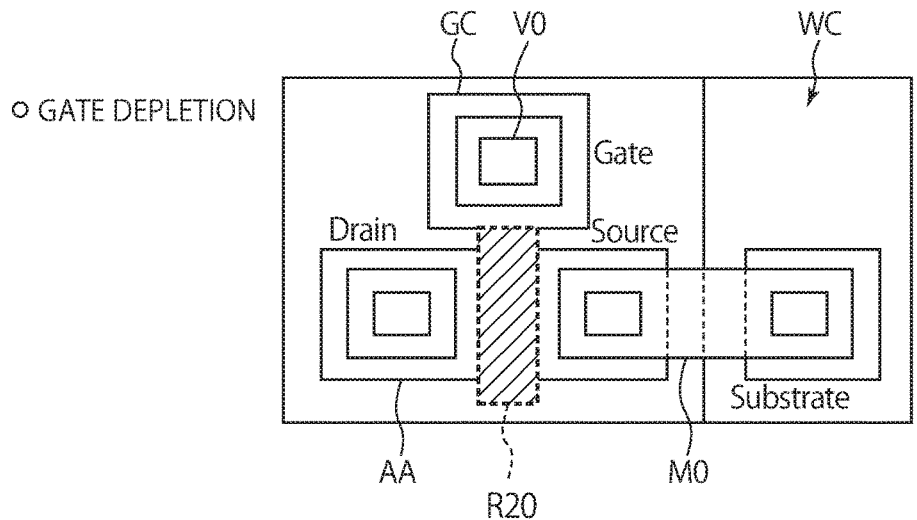
FIG. 22E is a diagram illustrating a region where a mesh is to be refined when a gate depletion in the MOSFET is extracted.
Figure 22F:
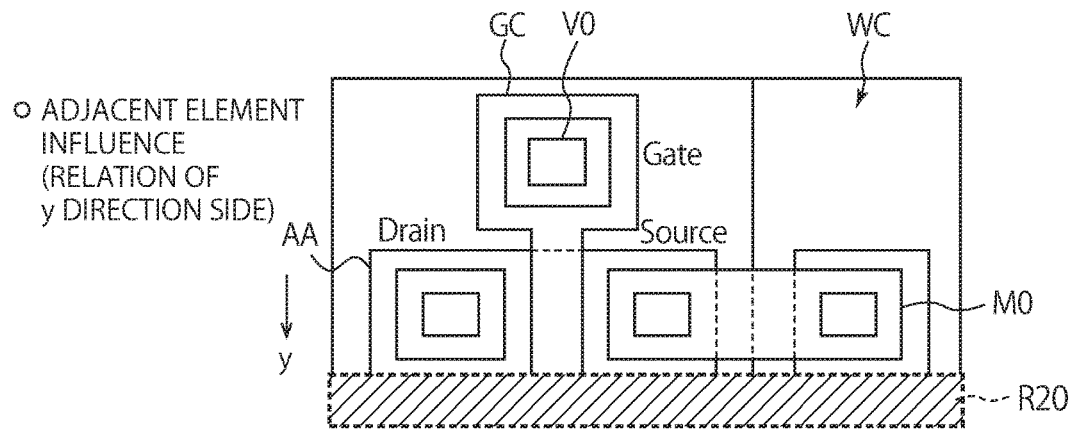
FIG. 22F is a diagram illustrating a region where a mesh is to be refined when an adjacent element influence in the MOSFET is extracted.

FIG. 21 is a block diagram illustrating a configuration of a TCAD system of a semiconductor device according to the fourth embodiment. In FIG. 21, the same reference sign is assigned to a configuration part common to FIG. 1, and the difference will be mainly described below. The TCAD system includes the layout editor/simulation region setting unit 112C of FIG. 20 in an editor unit 20C.

Although the description is based on the assumption that a process simulator 122 of a simulation execution unit 40C is the process simulator 122 of the first embodiment, the process simulator 122 may be that of the second or the third embodiment.

A controller 121C of the simulation execution unit 40C is configured so as to read two files of process simulation input data 161 and the simulation layout file 164C, and execute the simulation. In other words, the device simulation input data 162 and the characteristic extraction input data 163 of the first embodiment are not provided.

The engineer specifies, via the input device 102 and the display device 101, the device name and the device characteristic name.

The process simulator 122 executes a process simulation, similarly to the first embodiment, based on the layout described in the simulation layout file 164C, the process simulation input data 161 in which a process flow of the semiconductor device is described, and an initial mesh.

The simulation execution unit 40C performs, after the process simulation, a device simulation and the electrical characteristic extraction in accordance with the mesh setting information, the graphic operation, the one-dimensional simulation position, the voltage applying condition, and the electrical characteristic extraction setting in the simulation layout file 164C associated with the specified device name and device characteristic name.

More specifically, a device simulator 123C refines, based on the information of the graphic operation associated with the specified device name and device characteristic name, the mesh to be used in the simulation of the semiconductor device in the mesh refinement region (a predetermined region). In other words, the device simulator 123C performs, to the graphic of the layout (a first graphic), the graphic operation associated with the specified device name and device characteristic name, generates a new graphic (a second graphic), and sets the mesh refinement region at the position of the new graphic. When a plurality of graphics is generated, the device simulator 123C sets the mesh refinement region at the position of the graphic including the one-dimensional simulation position associated with the specified device name and device characteristic name. The device simulator 123C refines the mesh in the mesh refinement region according to the mesh setting information associated with the specified device name and device characteristic name. Next, the device simulator 123C executes the device simulation based on the refined mesh, the result of the process simulation, and the voltage applying condition associated with the specified device name and device characteristic name.

Finally, an electrical characteristic extraction unit (electrical characteristic extraction circuitry) 124 extracts, in accordance with the electrical characteristic extraction setting associated with the specified device name and device characteristic name, the electrical characteristic of the device from the result of the device simulation.

Thus, according to the specified device name and device characteristic name, after the mesh is refined in the appropriate region, it is possible to accurately extract the electrical characteristics.

Note that, the process simulator 122 may refine the mesh, similarly to the device simulator 123C, in accordance with the mesh setting information, the graphic operation, and the one-dimensional simulation position of the simulation layout file 164C associated with the specified device name and device characteristic name.

Here, the problem of the TCAD system of the first embodiment will be described. In the TCAD system of the first embodiment, the process simulation input data 161, the device simulation input data 162, and the characteristic extraction input data 163 are separated, and it is possible to execute a plurality of device simulations and characteristic extractions to a result of the process simulation. Furthermore, as illustrated in FIGS. 22A to 22F, since a region R20 or a line segment L1 where the mesh is to be refined is different according to the device characteristics to which the device simulation is executed, it is required to prepare a plurality of pairs of the device simulation input data 162 and the characteristic extraction input data 163 for one process simulation input data 161.

When an engineer who prepare the input data set and an engineer who executes the simulation using the data set are the same, this case does not cause a problem comparatively. However, there is a problem that the time required for maintenance and management of the input data set increases as the number of the types and generations of the device and the input data sets increases.

Moreover, when the engineer who prepared the input data set and the engineer who executes the simulation using the data set are different, the problem with information transmission occurs in addition to the problem of the maintenance and management. Whereby a simple error and usage in an unexpected and unguaranteed conditions happens, and a problem that it is applied to semiconductor device development without awareness of them may occur. This leads to the decrease in the semiconductor device development efficiency, and the semiconductor device development itself may be meaningless in some cases.

In contrast, in the fourth embodiment, the device name and device characteristic name, the voltage applying condition, the mesh setting information, the information of the graphic operation, the information of the one-dimensional simulation position, and the electrical characteristic extraction setting of the device characteristics are associated, and the associated information is written to the simulation layout file 164D. Thus, as illustrated in FIGS. 22A to 22F, even when the region where the mesh to be refined is different according to the device characteristics to which the simulation is executed, it is not required to prepare the pairs of the device simulation input data 162 and the characteristic extraction input data 163 to one process simulation input data 161. Therefore, in the case in which the engineer who prepares the input data set and the engineer who executes the simulation using the data set are the same, even when the kinds and generations of the device increase and the number of the input data sets increases, it is possible to efficiently perform maintenance and management.

Furthermore, in the case in which the engineer who prepares the input data set and the engineer who executes the simulation using the data set are different, the device name and the device characteristic name, the mesh refinement region (graphic operation), and the mesh setting information (mesh refinement setting) have been associated, and it is possible to suppress an error in use in the unexpected and unguaranteed conditions, such as usage of an wrong input data set from happening. Therefore, it is possible to efficiently high-accurately execute the simulation.

As described above, the engineer who uses the input data prepared by another engineer can efficiently high-accurately execute the simulation with the minimum time and labor, and it is possible to efficiently design the semiconductor device.

At least a portion of the TCAD system described in the above embodiments may be constituted by hardware or software. In the software configuration, a program realizing at least a portion of the functions of the TCAD system is stored in a recording medium such as a flexible disk or a CD-ROM and may be read by a computer to be executed thereby. The storage medium is not limited to a detachable one such as a magnetic disk and an optical disk and may be a stationary recording medium such as a hard disk device and a memory.

Furthermore, the program realizing at least a portion of the TCAD system may be distributed through a communication line (including wireless communication) such as the Internet. While the program is encrypted, modulated, or compressed, the program may be distributed through a wired line or a wireless line such as the Internet, or the program stored in a recording medium may be distributed.

As an example of that a program which implements a part of the functions of the TCAD system is stored in a non-transitory computer-readable recording medium, the following aspects can be considered.

(Appendix 1)

A non-transitory computer-readable recording medium recording a computer-readable simulation program causing a computer to perform a method including:

extracting vertex coordinates of a first graphic of a layout of a semiconductor device described in a layout file used for a simulation;

generating a first initial mesh passing through the vertex coordinates in a plane direction of the layout; and executing, based on simulation data in which a process flow of the semiconductor device is described, the layout, and the first initial mesh, a process simulation of the semiconductor device.

(Appendix 2)

The non-transitory computer-readable recording medium according to Appendix 1, in which the method further includes:

adding, to second mesh setting information, the extracted vertex coordinates, first mesh setting information associated with the first graphic and described in the layout file, and coordinates indicating a simulation region described in the simulation data or the layout file; and generating, in accordance with the second mesh setting information, the first initial mesh in the simulation region, and the first mesh setting information includes space information of the first initial mesh.

(Appendix 3)

The non-transitory computer-readable recording medium according to Appendix 1, in which the method further includes:

executing a process simulation in a depth direction at a plurality of simulation positions described in the layout file;

extracting, from a result of the process simulation in the depth direction, a material boundary position in a depth direction of a structure on a semiconductor substrate of the semiconductor device;

generating a second initial mesh passing through the extracted material boundary position; and executing the process simulation based on the simulation data, the layout, the first initial mesh, and the second initial mesh.

(Appendix 4)

The non-transitory computer-readable recording medium according to Appendix 1, in which the method further includes:

performing, to the first graphic, graphic operation including logical product operation described in the simulation data and generating a second graphic;

selecting, when a plurality of second graphics is generated by a graphic operation unit, the second graphic including a simulation position described in the layout file and specified in advance from the plurality of second graphics;

setting a mesh refinement region at a position of the second graphic selected by a graphic selection unit (graphic selector); and refining, in the middle of the process simulation, the first initial mesh in the mesh refinement region.

(Appendix 5)

The non-transitory computer-readable recording medium according to Appendix 3, in which the method further includes:

performing, to the first graphic, graphic operation described in the simulation data and generating a second graphic;

selecting, when a plurality of second graphics is generated by a graphic operation unit, the second graphic including a simulation position specified in advance among the plurality of simulation positions described in the layout file from the plurality of second graphics;

setting a mesh refinement region at a position of the second graphic selected by a graphic selection unit; and refining, in the middle of the process simulation, the first initial mesh in the mesh refinement region.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A process simulator comprising:
   layout processing circuitry to extract vertex coordinates of a first graphic of a layout of a semiconductor device described in a layout file used for a simulation;
   mesh setting processing circuitry to add, to second mesh setting information, the extracted vertex coordinates, first mesh setting information associated with the first graphic and described in the layout file, and coordinates indicating a simulation region described in the layout file or in simulation data in which a process flow of the semiconductor device is described;
   initial mesh generation circuitry to generate a first initial mesh passing through the vertex coordinates in the simulation region in a plane direction of the layout, in accordance with the second mesh setting information; and
   simulator circuitry to execute a process simulation of the semiconductor device based on the simulation data in which the process flow of the semiconductor device is described, the layout, and the first initial mesh,
   wherein the first mesh setting information comprises space information of the first initial mesh.

2. The process simulator according to claim 1, further comprising:
   one-dimensional simulation execution circuitry to execute a process simulation in a depth direction at a plurality of simulation positions described in the layout file; and
   material boundary position extraction circuitry to extract, from a result of the process simulation in the depth direction, a material boundary position in a depth direction of a structure on a semiconductor substrate of the semiconductor device,
   wherein:
   the initial mesh generation circuitry generates a second initial mesh passing through the extracted material boundary position, and
   the simulator circuitry executes the process simulation based on the simulation data, the layout, the first initial mesh, and the second initial mesh.

3. The process simulator according to claim 2, further comprising:
   graphic operation circuitry to perform, to the first graphic, a graphic operation described in the simulation data and generate a second graphic;
   graphic selection circuitry to select, when a plurality of second graphics are generated by the graphic operation circuitry, the second graphic comprising a simulation position described in the layout file and specified in advance among the plurality of simulation positions from the plurality of second graphics;
   mesh refinement setting processing circuitry to set a mesh refinement region at a position of the second graphic selected by the graphic selection circuitry; and
   mesh refinement circuitry to refine, in the middle of the process simulation, the first initial mesh in the mesh refinement region.

4. The process simulator according to claim 1, further comprising:
   graphic operation circuitry to perform, to the first graphic, a graphic operation comprising a logical product operation described in the simulation data and generate a second graphic;
   graphic selection circuitry to select, when a plurality of second graphics are generated by the graphic operation circuitry, the second graphic comprising a simulation position described in the layout file and specified in advance from the plurality of second graphics;
   mesh refinement setting processing circuitry to set a mesh refinement region at a position of the second graphic selected by the graphic selection circuitry; and
   mesh refinement circuitry to refine, in the middle of the process simulation, the first initial mesh in the mesh refinement region.

5. A layout editor comprising:
   a controller to process information input from an input/output circuitry to generate a layout of a semiconductor device;
   graphic processing circuitry to perform, to the layout before editing, creating a graphic of the layout, editing the graphic, and adding an identifier to the graphic, and generate a graphic indicating a simulation region where a simulation of the semiconductor device is executed, under the control of the controller;
   mesh setting information processing circuitry to associate mesh setting information of an initial mesh used for the simulation with the graphic using the identifier, under the control of the controller; and
   file input/output circuitry to read a first layout file, in which the layout before editing is described, and write, to a second layout file used for the simulation, information of the layout edited by the graphic processing circuitry, the mesh setting information associated with the graphic, and the graphic indicating the simulation region.

6. The layout editor according to claim 5, further comprising:
   device information processing circuitry to associate a device name and a device characteristic name of an extraction target of electrical characteristics of the semiconductor device, a voltage applying condition of the device characteristics, and information of graphic operation to set a mesh refinement region where a mesh is refined, under the control of the controller,
   wherein the file input/output circuitry writes information associated by the device information processing circuitry to the second layout file.

7. A simulation system comprising:
   input/output circuitry to input/output information;
   device information processing circuitry to associate, in accordance with the information input by the input/output circuitry, necessary information for a simulation of a semiconductor device;
   file input/output circuitry to write, to a layout file used for the simulation, information of a layout of the semiconductor device and the information associated by the device information processing circuitry;
   process simulator circuitry to execute a process simulation of the semiconductor device based on the layout described in the layout file and simulation data in which a process flow of the semiconductor device is described;
   device simulator circuitry to refine, based on necessary information for the simulation associated with an extraction target of electrical characteristics specified by the input/output circuitry, a mesh used for a simulation of the semiconductor device in a predetermined region and to execute a device simulation based on the refined mesh, a result of the process simulation, and the necessary information for the simulation associated with the specified extraction target; and electrical characteristic extraction circuitry to extract, in accordance with the necessary information for the simulation associated with the specified extraction target, electrical characteristics from a result of the device simulation.

8. The simulation system according to claim 7, wherein the device information processing circuitry associates, in accordance with the information input by the input/output circuitry, the extraction target, information of graphic operation, and a simulation position which are the necessary information for the simulation, and the device simulator circuitry performs, to a first graphic of the layout, the graphic operation associated with the specified extraction target, generates a second graphic, and sets, when a plurality of second graphics are generated, the predetermined region at a position of the second graphic comprising the simulation position associated with the specified extraction target.

9. The simulation system according to claim 7, wherein the process simulation circuitry comprises:

layout processing circuitry to extract vertex coordinates of a first graphic of the layout described in the layout file;

initial mesh generation circuitry to generate a first initial mesh passing through the vertex coordinates in a plane direction of the layout; and simulator circuitry to execute the process simulation based on the simulation data, the layout, and the first initial mesh.

10. The simulation system according to claim 9, wherein the process simulator circuitry comprises:

one-dimensional simulation execution circuitry to execute a process simulation in a depth direction at a plurality of simulation positions described in the layout file; and material boundary position extraction circuitry to extract, from a result of the process simulation in the depth direction, a material boundary position in a depth direction of a structure on a semiconductor substrate of the semiconductor device, and wherein:

the initial mesh generation circuitry generates a second initial mesh passing through the extracted material boundary position, and the simulator circuitry executes the process simulation based on the simulation data, the layout, the first initial mesh, and the second initial mesh.

11. The simulation system according to claim 9, wherein the process simulator circuitry comprises:

graphic operation circuitry to perform, to the first graphic, a graphic operation described in the simulation data and generate a second graphic;

graphic selection circuitry to select, when a plurality of second graphics are generated by the graphic operation circuitry, the second graphic comprising a simulation position described in the layout file and specified in advance from the plurality of second graphics;

mesh refinement setting processing circuitry to set a mesh refinement region at a position of the second graphic selected by the graphic selection circuitry; and mesh refinement circuitry to refine, in the middle of the process simulation, the first initial mesh in the mesh refinement region.

* * * * *